US011953248B2

(12) United States Patent
Yagi et al.

(10) Patent No.: US 11,953,248 B2
(45) Date of Patent: Apr. 9, 2024

(54) REFRIGERANT MANAGEMENT SYSTEM AND REFRIGERANT MANAGEMENT METHOD

(71) Applicant: DAIKIN INDUSTRIES, LTD., Osaka (JP)

(72) Inventors: Asuka Yagi, Osaka (JP); Masaya Nishimura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 275 days.

(21) Appl. No.: 17/603,504

(22) PCT Filed: Apr. 20, 2020

(86) PCT No.: PCT/JP2020/017015
§ 371 (c)(1),
(2) Date: Oct. 13, 2021

(87) PCT Pub. No.: WO2020/213740
PCT Pub. Date: Oct. 22, 2020

(65) Prior Publication Data
US 2022/0221206 A1    Jul. 14, 2022

(30) Foreign Application Priority Data

Apr. 19, 2019  (JP) ................................. 2019-080309
Apr. 19, 2019  (JP) ................................. 2019-080310

(51) Int. Cl.
*F25B 45/00*     (2006.01)
*G06Q 10/0639*   (2023.01)
*G06Q 10/20*     (2023.01)

(52) U.S. Cl.
CPC ....... *F25B 45/00* (2013.01); *G06Q 10/06398* (2013.01); *G06Q 10/20* (2013.01)

(58) Field of Classification Search
CPC ............... F25B 45/00; F25B 2245/003; G06Q 10/6398; G06Q 10/20; G06Q 10/087
See application file for complete search history.

(56) References Cited

U.S. PATENT DOCUMENTS

| 2004/0055317 | A1  | 3/2004 | Nomura et al. |
| 2009/0025406 | A1* | 1/2009 | Yoshimi ................. F25B 13/00 62/127 |

(Continued)

FOREIGN PATENT DOCUMENTS

| JP | 2006-293866 A | 10/2006 |
| JP | 2015-125672 A | 7/2015 |

(Continued)

OTHER PUBLICATIONS

European Search Report of corresponding EP Application No. 20 79 1748.5 dated Nov. 23, 2022.

(Continued)

*Primary Examiner* — Marc E Norman
(74) *Attorney, Agent, or Firm* — Global IP Counselors, LLP

(57) ABSTRACT

A refrigerant management system includes at least one computer including an acquisition unit and a generation unit. The acquisition unit, during installation and/or maintenance of a refrigerant use device, acquires first information, refrigerant already filled quantity, and refrigerant used quantity. The first information includes device specifying information, worker information, and refrigerant additionally filled quantity information. The refrigerant already filled quantity is preliminarily filled in the refrigerant use device, in accordance with the device specifying information. The refrigerant used quantity used in the refrigerant use device by totaling the refrigerant already filled quantity acquired and the refrigerant additionally filled quantity included in the refrigerant additionally filled quantity information. The gen- (Continued)

eration unit generates second information associating the refrigerant used quantity and the worker, from the refrigerant used quantity acquired by the acquisition unit and the worker information in the first information acquired by the acquisition unit.

18 Claims, 18 Drawing Sheets

(56) References Cited

U.S. PATENT DOCUMENTS

| | | | |
|---|---|---|---|
| 2009/0100849 A1* | 4/2009 | Nishimura | F25B 49/005 |
| | | | 62/149 |
| 2014/0174114 A1 | 6/2014 | Tamaki et al. | |
| 2020/0033036 A1 | 1/2020 | Yamada et al. | |
| 2022/0065510 A1* | 3/2022 | Yoshimi | F25B 41/20 |
| 2022/0074635 A1* | 3/2022 | Yoshimi | F25B 45/00 |

FOREIGN PATENT DOCUMENTS

| | | |
|---|---|---|
| JP | 60-46029 B2 | 12/2016 |
| JP | 2017-41096 A | 2/2017 |
| WO | 2018/062485 A1 | 4/2018 |

OTHER PUBLICATIONS

International Preliminary Report of corresponding PCT Application No. PCT/JP2020/017015 dated Oct. 28, 2021.

International Search Report of corresponding PCT Application No. PCT/JP2020/017015 dated Jul. 7, 2020.

* cited by examiner

| DEVICE ID | MODEL NAME | DEVICE MANUFACTURER ID | REFRIGERANT TYPE | REFRIGERANT ALREADY FILLED QUANTITY | ABILITY INFORMATION |
|---|---|---|---|---|---|
| AB00102 | RXYP280 | AA021 | R32 | 20.0 | 8 |
| AB00221 | RXYP360 | AA021 | R32 | 21.0 | 10 |
| AB00222 | RXYP480 | AA021 | R32 | 23.0 | 12 |
| ... | ... | | | | |
| AC00012 | RXYQ280 | AA021 | R410A | 20.5 | 8 |
| AC00086 | RXYQ360 | AA021 | R410A | 21.5 | 10 |
| AC00250 | RXYQ480 | AA021 | R410A | 23.5 | 12 |
| ... | ... | | | | |

FIG. 5

| WORKER ID | DISTRIBUTION | INSTALLATION | MAINTENANCE | COLLECTION | REGENERATION | DISCARD |
|---|---|---|---|---|---|---|
| CA006 | | ○ | | ○ | | |
| CA015 | | ○ | ○ | ○ | | |
| GA019 | | | | | ○ | |
| HA019 | ○ | | | | | |
| ⋮ | ⋮ | | | | | |

| WORKER ID | REFRIGERANT TYPE | REFRIGERANT HELD QUANTITY | REFRIGERANT USED QUANTITY | REFRIGERANT TO-BE-COLLECTED QUANTITY | REFRIGERANT COLLECTED QUANTITY | REFRIGERANT REGENERATED QUANTITY | REFRIGERANT DISCARDED QUANTITY | REFRIGERANT TO-BE-DISTRIBUTED QUANTITY | REFRIGERANT DISTRIBUTED QUANTITY |
|---|---|---|---|---|---|---|---|---|---|
| CA006 | R32 | 1000.0 | 800.0 | 50.0 | 250.0 | | | 400.0 | 400.0 |
| CA015 | R410A | 2500.0 | 2000.0 | 150.0 | 400.0 | | | 200.0 | 200.0 |
| ... | ... | | | | | | | | |
| GA019 | R32 | 300.0 | | | | 200.0 | 0 | | |
| GA019 | R410A | 200.0 | | | | 300.0 | 0 | | |
| ... | ... | | | | | | | | |
| HA019 | R32 | 30000.0 | | | | | | | |
| HA019 | R410A | 20000.0 | | | | | | | |
| ... | ... | | | | | | | | |

FIG. 13

| WORKER ID | REFRIGERANT TYPE | REFRIGERANT HELD QUANTITY | REFRIGERANT USED QUANTITY | REFRIGERANT TO-BE-COLLECTED QUANTITY | REFRIGERANT COLLECTED QUANTITY | REFRIGERANT REGENERATED QUANTITY | REFRIGERANT DISCARDED QUANTITY | REFRIGERANT TO-BE-DISTRIBUTED QUANTITY | REFRIGERANT DISTRIBUTED QUANTITY |
|---|---|---|---|---|---|---|---|---|---|
| CA006 | R32 | 1000.0 | 800.0 | | | | | 200.0 | 200.0 |
| CA015 | R410A | 2500.0 | 2000.0 | | | | | 100.0 | 100.0 |
| DA009 | R32 | 1200.0 | 900.0 | | | | | 50.0 | 50.0 |
| DA009 | R410A | 1800.0 | 1500.0 | | | | | 150.0 | 150.0 |
| FA012 | R32 | | | 150.0 | 400.0 | | | | |
| FA012 | R410A | | | 350.0 | 200.0 | | | | |
| ... | ... | | | | | | | | |
| GA019 | R32 | 300.0 | | | | 200.0 | 0 | | |
| GA019 | R410A | 200.0 | | | | 300.0 | 0 | | |
| ... | ... | | | | | | | | |
| HA019 | R32 | 30000.0 | | | | | | | |
| HA019 | R410A | 20000.0 | | | | | | | |
| ... | ... | | | | | | | | |

FIG. 15

| PROPERTY ID | REFRIGERANT TYPE | REFRIGERANT QUANTITY |
|---|---|---|
| ZZA11122 | R32 | 40.0 |
| ZZA11123 | R32 | 100.0 |
| ZZA11124 | R32 | 80.0 |
| ... | ... | |

FIG. 16

| DEVICE OWNER ID | REFRIGERANT TYPE | REFRIGERANT QUANTITY |
|---|---|---|
| AC041253 | R32 | 20.0 |
| AC041254 | R32 | 80.0 |
| AC041255 | R32 | 50.0 |
| ... | ... | |

FIG. 17

REFRIGERANT MANAGEMENT SYSTEM AND REFRIGERANT MANAGEMENT METHOD

CROSS-REFERENCE TO RELATED APPLICATIONS

This U.S. National stage application claims priority under 35 U.S.C. § 119(a) to Japanese Patent Application Nos. 2019-080309 and 2019-080310, filed in Japan on Apr. 19, 2019, the entire contents of which are hereby incorporated herein by reference.

BACKGROUND

Field of the Invention

The present disclosure relates to a system and a method for refrigerant management.

BACKGROUND INFORMATION

As disclosed in JP 2015-125672 A, there has been conventionally known a system configured to manage a refrigerant for reuse or the like of the refrigerant in accordance with information on a fluorocarbon refrigerant having been delivered or to be delivered to a fluorocarbon collection worker.

SUMMARY

There is a problem of difficulty in management of the refrigerant until being delivered to the collection worker and appropriate supply of the refrigerant to a demander for the refrigerant.

A refrigerant management system according to a first aspect includes one or a plurality of computers. The computer includes an acquisition unit and a generation unit. The acquisition unit acquires first information, refrigerant already filled quantity, and refrigerant used quantity. The generation unit generates second information. The first information includes device specifying information for specifying a refrigerant use device, worker information on a worker to execute work relevant to the refrigerant use device, and refrigerant additionally filled quantity information including refrigerant additionally filled quantity that is refrigerant quantity additionally filled in the refrigerant use device. The refrigerant already filled quantity is refrigerant quantity preliminarily filled in the refrigerant use device. The refrigerant used quantity is refrigerant quantity used in the refrigerant use device. The second information associates the refrigerant used quantity with the worker. The acquisition unit acquires the first information during at least one of installation and maintenance of the refrigerant use device. The acquisition unit acquires the refrigerant already filled quantity in accordance with the device specifying information in the first information thus acquired. The acquisition unit acquires the refrigerant used quantity by totaling the refrigerant already filled quantity thus acquired and the refrigerant additionally filled quantity included in the refrigerant additionally filled quantity information in the first information thus acquired. The generation unit generates the second information from the refrigerant used quantity acquired by the acquisition unit and the worker information in the first information acquired by the acquisition unit.

The refrigerant management system according to the first aspect can manage the refrigerant not yet delivered to a collection worker.

A refrigerant management system according to a second aspect is the system according to the first aspect, in which the computer further includes a storage unit. The storage unit stores the refrigerant already filled quantity in association with the device specifying information. The acquisition unit acquires the refrigerant already filled quantity stored in the storage unit in accordance with the device specifying information in the first information thus acquired.

The refrigerant management system according to the second aspect can acquire refrigerant quantity used in the refrigerant use device.

A refrigerant management system according to a third aspect is the system according to the first aspect, in which the acquisition unit acquires ability information on ability of the refrigerant use device in accordance with the device specifying information in the first information thus acquired, and acquires the refrigerant already filled quantity in accordance with the ability information thus acquired.

The refrigerant management system according to the third aspect can acquire a predictive value of refrigerant quantity preliminarily filled in the refrigerant use device.

A refrigerant management system according to a fourth aspect is the system according to the first aspect, in which the acquisition unit acquires input data including ability information on ability of the refrigerant use device, and acquires the refrigerant already filled quantity in accordance with the ability information included in the input data.

The refrigerant management system according to the fourth aspect can acquire a predictive value of refrigerant quantity preliminarily filled in the refrigerant use device.

A refrigerant management system according to a fifth aspect is the system according to the first aspect, in which, when the refrigerant already filled quantity is stored in association with the device specifying information, the acquisition unit acquires the refrigerant already filled quantity being stored in accordance with the device specifying information in the first information thus acquired. When the refrigerant already filled quantity is not stored in association with the device specifying information, the computer acquires ability information on ability of the refrigerant use device in accordance with the device specifying information in the first information thus acquired, and acquires the refrigerant already filled quantity in accordance with the ability information thus acquired.

The refrigerant management system according to the fifth aspect can acquire an appropriate value applicable as refrigerant quantity preliminarily filled in the refrigerant use device.

A refrigerant management system according to a sixth aspect is the system according to any one of the first to fifth aspects, in which the acquisition unit acquires total refrigerant used quantity of a plurality of the refrigerant use devices serving as work targets of the worker, in accordance with a plurality of pieces of the first information. The generation unit further generates, as the second information, information associating the total quantity acquired by the acquisition unit and the worker.

The refrigerant management system according to the sixth aspect can manage, in association with each worker, refrigerant quantity filled and used in all the refrigerant use devices serving as work targets of the worker.

A refrigerant management system according to a seventh aspect is the system according to any one of the first to sixth aspects, in which the acquisition unit acquires refrigerant to-be-collected quantity that is refrigerant quantity to be collected from the refrigerant use device within a predetermined period in accordance with the first information. The generation unit further generates, as the second information, information associating the refrigerant to-be-collected quantity acquired by the acquisition unit and the worker.

The refrigerant management system according to the seventh aspect can manage refrigerant quantity expected to be collected from the refrigerant use device.

A refrigerant management system according to an eighth aspect is the system according to the seventh aspect, in which the first information further includes third information. The acquisition unit acquires the refrigerant to-be-collected quantity in accordance with the third information. The third information includes a work day or a work month of execution of at least one of installation work during installation of the refrigerant use device and maintenance work during maintenance of the refrigerant use device.

The refrigerant management system according to the eighth aspect can apply the refrigerant to-be-collected quantity as an appropriate predictive value of refrigerant quantity to be collected from the refrigerant use device within a predetermined period.

A refrigerant management system according to a ninth aspect is the system according to the eighth aspect, in which the acquisition unit acquires the refrigerant to-be-collected quantity in accordance with refrigerant quantity used in the refrigerant use device after elapse of the predetermined period since the work day or the work month included in the third information.

The refrigerant management system according to the ninth aspect can apply the refrigerant to-be-collected quantity as an appropriate predictive value of refrigerant quantity to be collected from the refrigerant use device within the predetermined period. A refrigerant management system according to a tenth aspect is the system according to any one of the first to sixth aspects, in which the computer further includes an evaluation unit. The evaluation unit evaluates the worker in accordance with at least one of the number of the refrigerant use devices serving as work targets of the worker and the refrigerant used quantity that is refrigerant quantity used in the refrigerant use devices serving as the work targets of the worker.

The refrigerant management system according to the tenth aspect can appropriately supply the refrigerant to the worker needing the refrigerant.

A refrigerant management system according to an eleventh aspect is the system according to the tenth aspect, in which the evaluation unit evaluates the worker in accordance with the second information generated by the generation unit.

The refrigerant management system according to the eleventh aspect can appropriately calculate refrigerant quantity suppliable to each worker.

A refrigerant management system according to a twelfth aspect is the system according to the eleventh aspect, in which the acquisition unit acquires refrigerant to-be-collected quantity that is refrigerant quantity to be collected from the refrigerant use device within a predetermined period in accordance with the refrigerant used quantity thus acquired. The generation unit further generates, as the second information, information associating the refrigerant to-be-collected quantity acquired by the acquisition unit and the worker. The evaluation unit evaluates the worker in accordance with the refrigerant to-be-collected quantity.

The refrigerant management system according to the twelfth aspect can appropriately calculate refrigerant quantity suppliable to each worker.

A refrigerant management system according to a thirteenth aspect is the system according to the twelfth aspect, in which the first information further includes third information including a work day or a work month of execution of at least one of installation work during installation of the refrigerant use device and maintenance work during maintenance of the refrigerant use device. The acquisition unit acquires the refrigerant to-be-collected quantity in accordance with refrigerant quantity used in the refrigerant use device after elapse of a predetermined period since the work day or the work month included in the third information.

The refrigerant management system according to the thirteenth aspect can apply the refrigerant to-be-collected quantity as an appropriate predictive value of refrigerant quantity to be collected from the refrigerant use device within the predetermined period.

A refrigerant management system according to a fourteenth aspect is the system according to the twelfth or thirteenth aspect, in which the evaluation unit calculates refrigerant quantity suppliable to the worker in accordance with the refrigerant to-be-collected quantity.

The refrigerant management system according to the fourteenth aspect can appropriately calculate refrigerant quantity suppliable to each worker.

A refrigerant management system according to a fifteenth aspect is the system according to any one of the twelfth to fourteenth aspects, in which the acquisition unit acquires refrigerant collected quantity that is refrigerant quantity collected from the refrigerant use device. The evaluation unit evaluates the worker in accordance with the refrigerant collected quantity and the refrigerant to-be-collected quantity, and calculates refrigerant quantity suppliable to the worker.

The refrigerant management system according to the fifteenth aspect can appropriately supply the refrigerant to the worker needing the refrigerant.

A refrigerant management system according to a sixteenth aspect is the system according to the fifteenth aspect, in which the acquisition unit acquires refrigerant supplied quantity that is refrigerant quantity supplied to the worker. The evaluation unit evaluates the worker in accordance with the refrigerant collected quantity, the refrigerant supplied quantity, and the refrigerant to-be-collected quantity, and calculates refrigerant quantity suppliable to the worker.

The refrigerant management system according to the sixteenth aspect can appropriately supply the refrigerant to the worker needing the refrigerant.

A refrigerant management system according to a seventeenth aspect is the system according to any one of the eleventh to sixteenth aspects, in which the acquisition unit acquires refrigerant regenerated quantity that is refrigerant quantity collected from the refrigerant use device and regenerated. The evaluation unit evaluates the worker in accordance with the refrigerant regenerated quantity and the refrigerant used quantity.

The refrigerant management system according to the seventeenth aspect can appropriately supply the refrigerant to the worker needing the refrigerant.

A refrigerant management method according to an eighteenth aspect includes acquiring first information, acquiring refrigerant already filled quantity, acquiring refrigerant used quantity, and generating second information. The first information includes device specifying information for specifying a refrigerant use device, worker information on a worker to execute work relevant to the refrigerant use device, and refrigerant additionally filled quantity information including refrigerant additionally filled quantity that is refrigerant quantity additionally filled in the refrigerant use device. The refrigerant already filled quantity is refrigerant quantity preliminarily filled in the refrigerant use device. The refrigerant used quantity is refrigerant quantity used in the refrigerant use device. The second information associates the refrigerant used quantity and the worker. The method includes acquiring the first information during at least one of installation and maintenance of the refrigerant use device. The method includes acquiring the refrigerant already filled quantity in accordance with the device specifying information in the first information thus acquired. The method includes acquiring the refrigerant used quantity by totaling the refrigerant already filled quantity thus acquired and the refrigerant additionally filled quantity included in the refrigerant additionally filled quantity information in the first information thus acquired. The method includes generating the second information from the refrigerant used quantity thus acquired and the worker information in the first information thus acquired.

The refrigerant management method according to the eighteenth aspect enables management of the refrigerant not yet delivered to a collection worker.

BRIEF DESCRIPTION OF THE DRAWINGS

FIG. 5 is an explanatory chart of a device information database DB1.

FIG. 6 is a chart indicating work contents for respective workers.

FIG. 13 is an explanatory chart of exemplary second information with access authority only for a manager S.

FIG. 15 is an explanatory chart of second information according to a modification example B.

FIG. 16 is an explanatory chart of second information according to a modification example C.

FIG. 17 is an explanatory chart of the second information according to the modification example C.

DESCRIPTION OF EMBODIMENTS (1) Entire Configuration

A refrigerant management system 100 is configured to manage a refrigerant used in a refrigerant use device. The refrigerant use device includes a vapor compression refrigeration cycle that uses a refrigerant. Examples of the refrigerant use device include an air conditioner, an air cleaner, a heat pump hot water supply apparatus, a refrigeration apparatus, and a cold storage apparatus. Examples of the refrigerant used in the refrigerant use device include R32, R452B, R410A, R454B, an HFO mixed refrigerant (e.g. a mixed refrigerant including HFO-1123 and R32), $CO_2$, and $CF_3I$ (by itself or a mixed refrigerant thereof).

Figure 1:
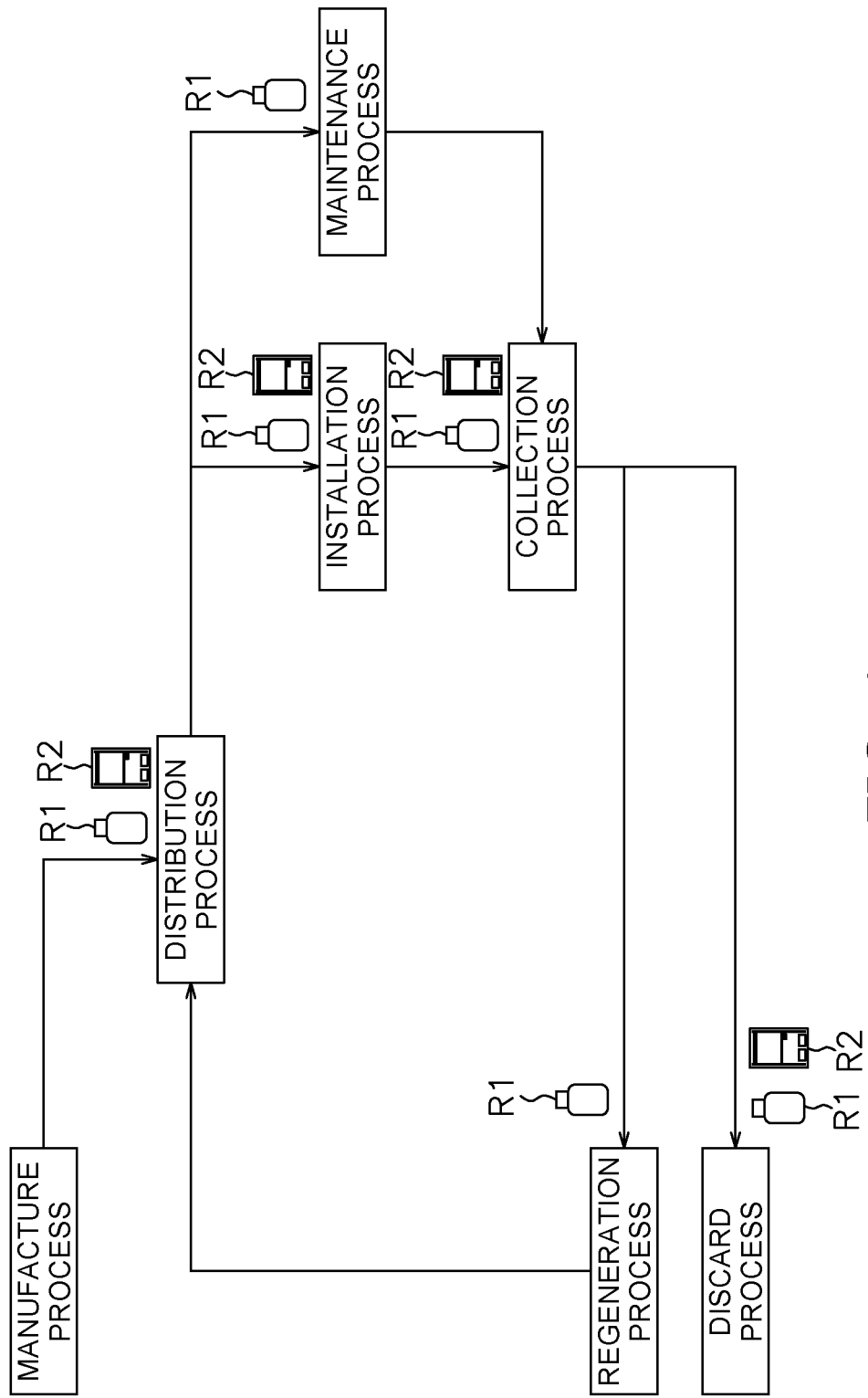
FIG. 1 is a schematic view of a refrigerant circulation cycle.

Refrigerant management executed by the refrigerant management system 100 means centrally grasping a refrigerant flowing in a refrigerant circulation cycle or providing each worker with information on the refrigerant thus grasped. FIG. 1 is a schematic view of the refrigerant circulation cycle. The refrigerant circulation cycle is principally constituted by a manufacture process, a distribution process, an installation process, a maintenance process, a collection process, a regeneration process, and a discard process. FIG. 1 includes arrows each indicating a flow of the refrigerant. The refrigerant flows in a states of being filled in a dedicated container such as a cylinder, or a refrigerant use device. FIG. 1 indicates flows of a container R1 filled with the refrigerant and a refrigerant use device R2 filled with the refrigerant.

In the manufacture process, the refrigerant is newly manufactured by a refrigerant manufacturer. In the distribution process, the newly manufactured refrigerant is filled in a dedicated cylinder or the like to be shipped. Examples of a destination of the refrigerant include a manufacturer of a refrigerant use device (hereinafter, called a "device manufacturer"), an installation worker of a refrigerant use device, and a maintenance worker of a refrigerant use device. The device manufacturer, the installation worker, and the maintenance worker may be identical or different from one another. The device manufacturer fills the refrigerant use device with the refrigerant as necessary upon manufacture or shipment of the refrigerant use device.

In the distribution process, a refrigerant distribution worker distributes a newly manufactured refrigerant or a regenerated refrigerant. The distribution worker buys a refrigerant manufactured by the refrigerant manufacturer or the regenerated refrigerant, and sells the refrigerant to at least one of the device manufacturer, the installation worker, and the maintenance worker. The distribution worker may be a refrigerant seller. The distribution worker may be a worker to distribute refrigerant use devices each filled with a refrigerant.

In the installation process, the installation worker installs the refrigerant use device at a predetermined installation site. Examples of the predetermined installation site include a property such as a building used or owned by an owner of the refrigerant use device. The installation worker fills the refrigerant use device and a refrigerant pipe with the refrigerant by means of a cylinder or the like filled with the refrigerant as necessary, during installation of the refrigerant use device.

In the maintenance process, the maintenance worker maintains and manages the refrigerant use device having been installed. Specifically, the maintenance worker inspects or repairs the refrigerant use device. The maintenance worker replaces the refrigerant filled in the refrigerant use device or refills the refrigerant use device with the refrigerant for replenishment by means of a cylinder or the like filled with the refrigerant as necessary. The refrigerant is replaced, exemplarily after elapse of a predetermined period since installation of the refrigerant use device. The refrigerant is refilled, exemplarily when the refrigerant filled in the refrigerant use device is found to be short in quantity upon inspection.

In the collection process, the refrigerant collection worker collects the refrigerant filled in the refrigerant use device or the refrigerant filled in the refrigerant use device and the refrigerant pipe installed in the property. The collection worker collects the refrigerant upon repair, relocation, discard, or the like of the refrigerant use device. Examples of a refrigerant collection method include a collection method of gathering, into the refrigerant use device, the refrigerant filled in the refrigerant pipe, and a collection method of filling a dedicated cylinder or the like with the refrigerant in the refrigerant use device and the refrigerant in the refrigerant pipe. The collection worker collects by extracting the refrigerant from the refrigerant use device also upon replacement of the refrigerant filled in the refrigerant use device.

In the regeneration process, a refrigerant regeneration worker regenerates the refrigerant collected by the collection worker. Examples of refrigerant regeneration include removing impurities from the collected refrigerant, and regenerating a refrigerant from the collected refrigerant. The regeneration worker receives, from the collection worker, the cylinder or the like filled with a refrigerant to be regenerated and regenerates a refrigerant. The regenerated refrigerant is filled in a dedicated cylinder or the like.

In the discard process, part of the refrigerant collected by the collection worker is discarded by a discard worker. Examples of refrigerant discard include chemically destroying the refrigerant for conversion to a substance less likely to affect human bodies and the environments, and keeping the refrigerant so as not to be used. The discard worker receives, from the collection worker, the refrigerant use device and the cylinder or the like filled with a refrigerant to be discarded and discards the refrigerant.

Hereinafter, a "worker" will indicate, unless otherwise specified, the device manufacturer, the refrigerant manufacturer, the installation worker, the maintenance worker, the collection worker, the regeneration worker, or the distribution worker. At least part of these workers may be identical. For example, the device manufacturer, the installation worker, the maintenance worker, and the collection worker may be identical, and the regeneration worker and the distribution worker may be identical. The present embodiment assumes that the installation worker, the maintenance worker, and the collection worker are identical. Each of the workers is assigned with a login ID necessary for access to the refrigerant management system 100. A plurality of different workers will not be assigned with any identical login ID. Each of the workers logs in with use of the own login ID to access the refrigerant management system 100.

Figure 2:
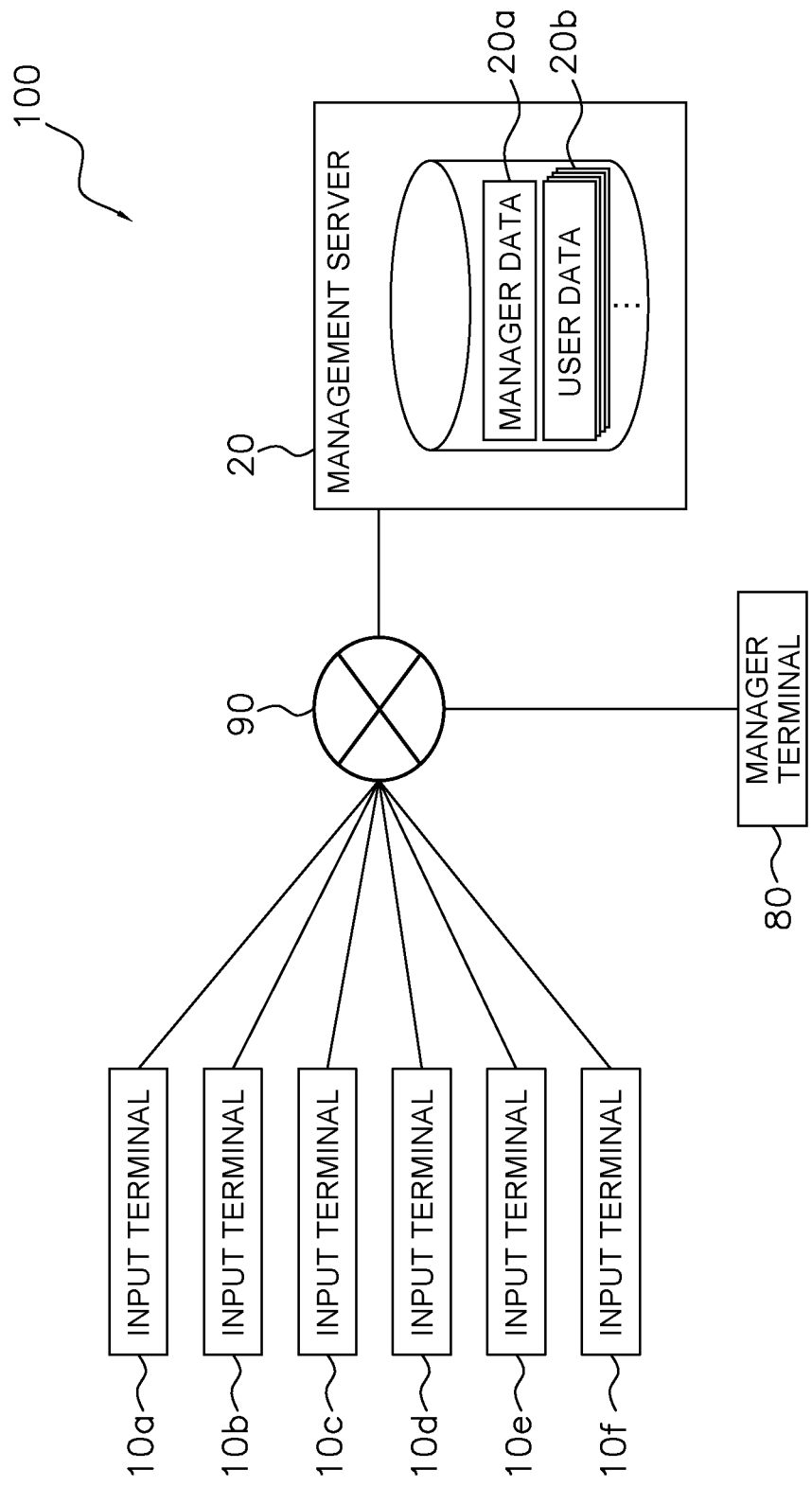
FIG. 2 is a view depicting a network configuration of a refrigerant management system 100.
Figure 3:
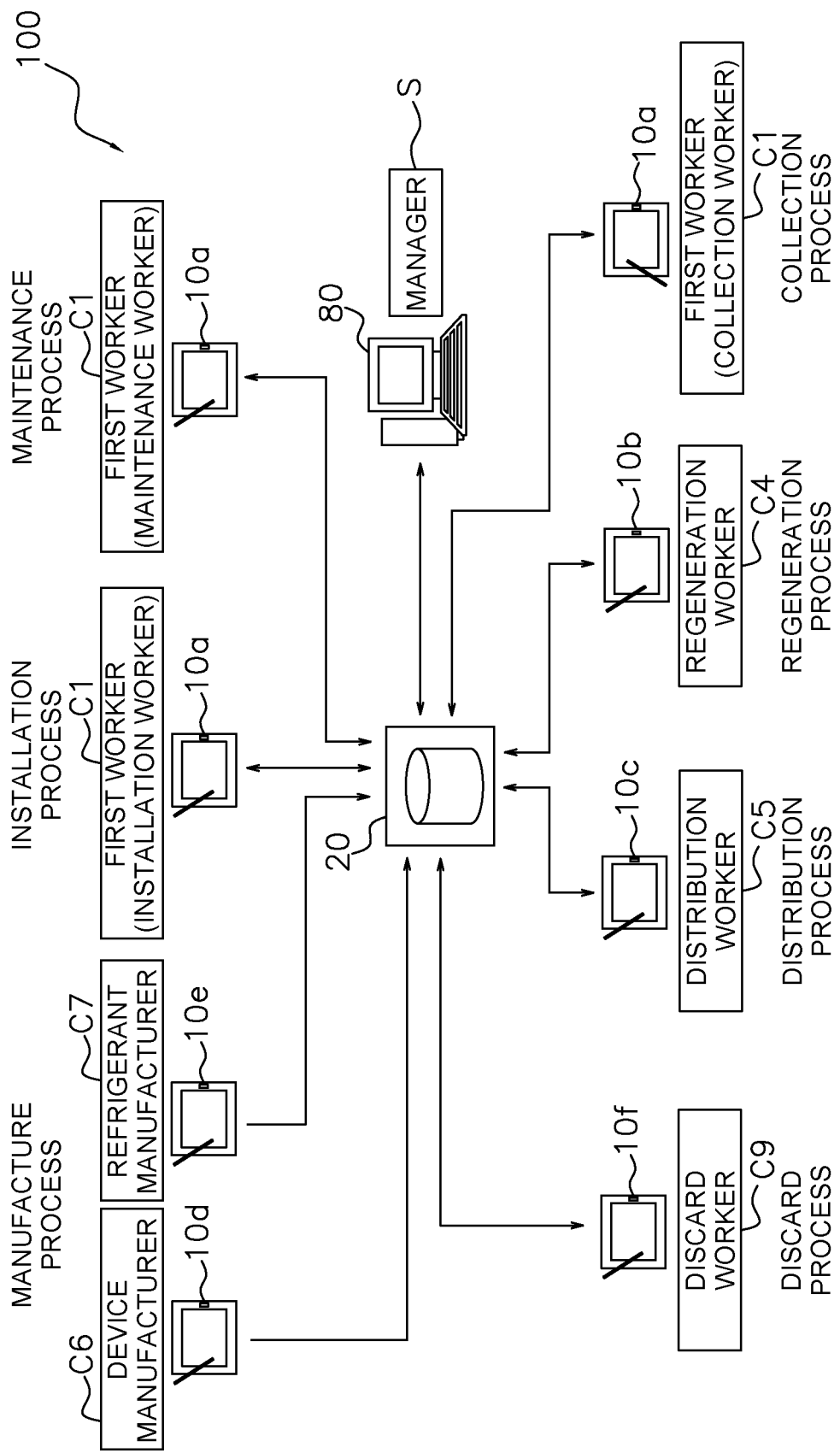
FIG. 3 is a schematic view depicting an entire configuration of the refrigerant management system 100.

FIG. 2 is a view depicting a network configuration of the refrigerant management system 100. FIG. 3 is a schematic view depicting an entire configuration of the refrigerant management system 100. FIG. 3 includes arrows indicating flows of data treated by the refrigerant management system 100.

The refrigerant management system 100 principally includes a plurality of input terminals 10a, 10b, . . . , a single management server 20, a single manager terminal 80, and a network 90 connecting these elements. Examples of the network 90 include the Internet.

Each of the input terminals 10a, 10b, . . . is a client computer used and managed by the worker. Examples of the input terminals 10a, 10b, . . . include a mobile terminal such as a smartphone or a tablet device. In a case where the worker is a group such as a company, each of the input terminals 10a, 10b, . . . is actually operated by an individual belonging to the worker, like a service person of a manufacturer. Hereinafter, the term "worker" also indicates a person actually operating each of the input terminals 10a, 10b, . . . . The workers operates the input terminals 10a, 10b, . . . and input predetermined data to the input terminals 10a, 10b, . . . to work with the refrigerant flowing in the refrigerant circulation cycle. The input terminals 10a, 10b, . . . each have a function of transmitting the data inputted by the workers to the management server 20 via the network 90. The input terminals 10a, 10b, . . . each have a function of receiving predetermined data from the management server 20 as necessary. In the refrigerant management system 100 depicted in FIG. 3, a first worker C1, a regeneration worker C4, a distribution worker C5, a device manufacturer C6, a refrigerant manufacturer C7, and a discard worker C9 each have the input terminal 10a, the input terminal 10b, the input terminal 10c, the input terminal 10d, the input terminal 10e, and the input terminal 10f. The first worker C1 according to the present embodiment serves as all of the installation worker, the maintenance worker, and the collection worker. The regeneration worker C4, the distribution worker C5, the device manufacturer C6, the refrigerant manufacturer C7, and the discard worker C9 are different from one another and are each different from the first worker C1.

The management server 20 is a server computer managed by a manager S of the refrigerant management system 100. The management server 20 may be a rental server, a virtual server offered through a cloud service, or the like. The management server 20 operates to accumulate and process data received from the input terminals 10a, 10b, . . . , relay from the network 90, manage the network 90, and the like. The management server 20 has a function of transmitting and receiving predetermined data to and from the input terminals 10a, 10b, . . . via the network 90. As depicted in FIG. 2, the management server 20 stores manager data 20a and user data 20b. The manager data 20a is data with access authority only for the manager S of the refrigerant management system 100. The user data 20b is data with access authority for the workers. The management server 20 stores the user data 20b for each of the workers. The worker having logged in the refrigerant management system 100 can access the own user data 20b with use of the own one of the input terminals 10a, 10b, . . . . The manager S has access authority to the user data 20b of all the workers.

The manager terminal 80 is a computer used by the manager S of the refrigerant management system 100. The manager S accesses the management server 20 with use of the manager terminal 80 to manage the refrigerant flowing in the refrigerant circulation cycle. For example, the manager S acquires predetermined data from the management server 20 with use of the manager terminal 80 and provides the workers with information and services relevant to the refrigerant managed by the refrigerant management system 100.

The workers operate the input terminals 10a, 10b, . . . to directly input predetermined data to the management server 20. The management server 20 is configured to acquire and store first information in accordance with data inputted to the management server 20 by the workers through operation of the input terminals 10a, 10b, . . . . When any of the workers also serves as the manager S, the corresponding worker has both a login ID for the manager and the login ID for the worker. The management server 20 is configured to acquire and store the first information in accordance with data inputted to the management server 20 by the worker through operation of the manager terminal 80. The management server 20 is configured to generate and store second information in accordance with the first information thus acquired. The first information and the second information will be described in detail later.

(2) Detailed Configurations

Figure 4:
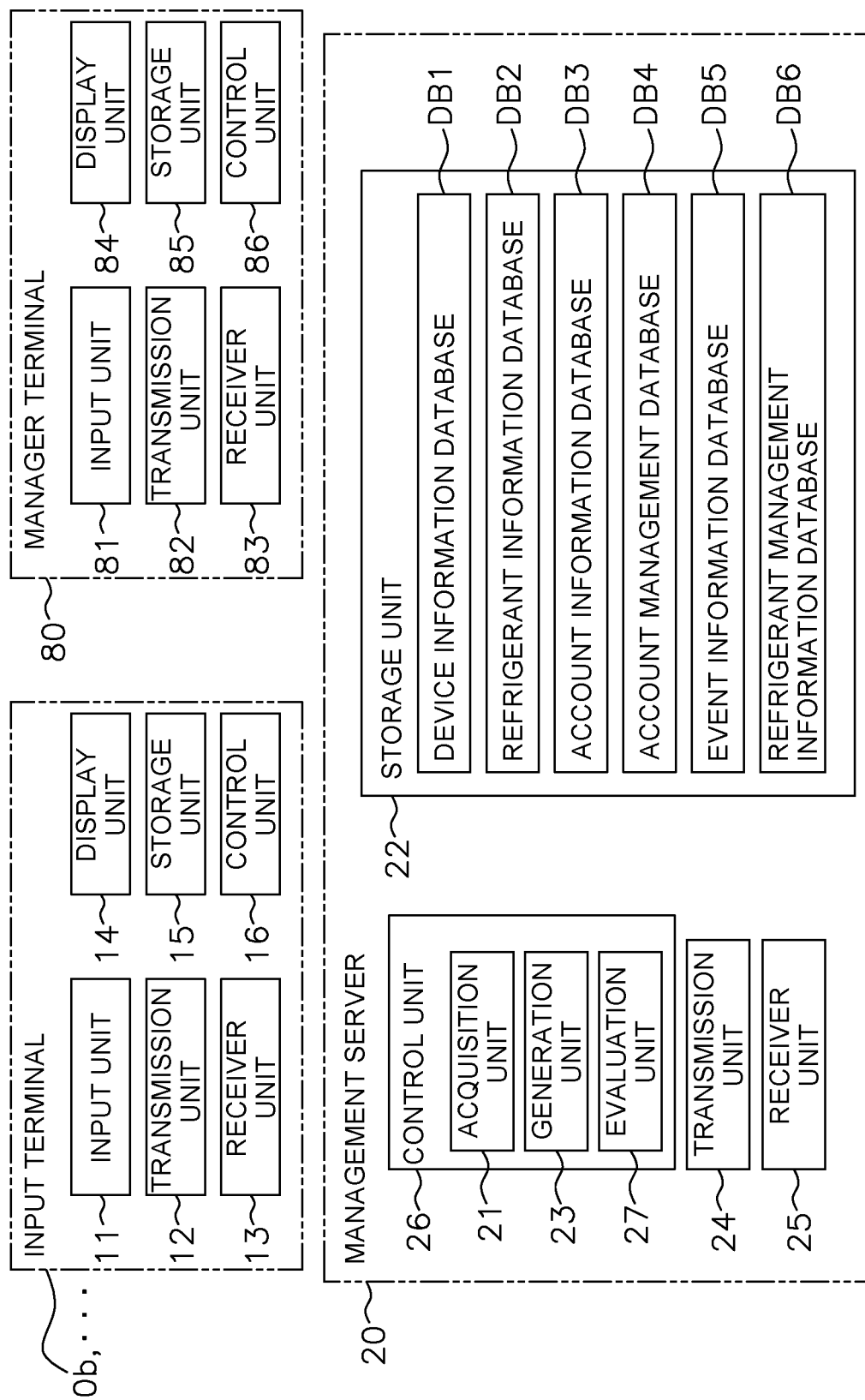
FIG. 4 is a block diagram of input terminals 10a, 10b, . . . , a manager terminal 80, and a management server 20.

FIG. 4 is a block diagram of the input terminals 10a, 10b, . . . , the manager terminal 80, and the management server 20.

(2-1) Input terminal

Each of the input terminals 10a, 10b, . . . principally includes an input unit 11, a transmission unit 12, a receiver unit 13, a display unit 14, a storage unit 15, and a control unit 16.

The input unit 11 receives operation of a corresponding one of the input terminals 10a, 10b, . . . by the corresponding worker. The transmission unit 12 transmits data to the management server 20 via the network 90. The receiver unit 13 receives data from the management server 20 via the network 90. Examples of the data received by the receiver unit 13 include the first information and the second information stored in the management server 20. The display unit 14 causes a display of the corresponding one of the input terminals 10a, 10b, . . . to display predetermined data. Examples of the data displayed by the display unit 14 include data inputted to the management server 20 through operation of the input terminal 10 by the worker, and data received from the management server 20. The storage unit 15 stores data and the like received from the management server 20. The control unit 16 controls the input unit 11, the transmission unit 12, the receiver unit 13, the display unit 14, and the storage unit 15.

(2-2) Manager terminal

The manager terminal 80 principally includes an input unit 81, a transmission unit 82, a receiver unit 83, a display unit 84, a storage unit 85, and a control unit 86.

The input unit 81 receives operation of the manager terminal 80 by the manager S. The transmission unit 82 transmits data to the management server 20 via the network 90. The receiver unit 83 receives data from the management server 20 via the network 90. Examples of the data received by the receiver unit 83 include the first information and the second information stored in the management server 20. The display unit 84 causes a display of the manager terminal 80 to display predetermined data. Examples of the data displayed by the display unit 84 include data inputted to the management server 20 through operation of the manager terminal 80 by the manager S, and data received from the management server 20. The storage unit 85 stores data and the like received from the management server 20. The control unit 86 controls the input unit 81, the transmission unit 82, the receiver unit 83, the display unit 84, and the storage unit 85.

(2-3) Management server

The management server 20 principally includes a control unit 26, a storage unit 22, a transmission unit 24, and a receiver unit 25.

The control unit 26 is a microcontroller, a CPU, or the like configured to read and execute a program. The control unit 26 principally includes an acquisition unit 21, a generation unit 23, and an evaluation unit 27. The acquisition unit 21, the generation unit 23, and the evaluation unit 27 each correspond to a function achieved by the program read and executed by the control unit 26.

The acquisition unit 21 acquires first information in accordance with data inputted to the management server 20 through operation of the input terminals 10a, 10b, . . . or the manager terminal 80 by the workers. The acquisition unit 21 acquires the first information during at least one of installation and maintenance of the refrigerant use device. In other words, the acquisition unit 21 acquires the first information in at least one of the installation process and the maintenance process of the refrigerant circulation cycle depicted in FIG. 1.

The generation unit 23 generates second information in accordance with the first information acquired by the acquisition unit 21.

The evaluation unit 27 evaluates the worker in accordance with the first information stored in the storage unit 22 according to at least one of the number of refrigerant use devices 30 serving as work targets of the worker and refrigerant quantity used in the refrigerant use devices 30 serving as the work targets of the worker. Specifically, the evaluation unit 27 evaluates the worker in accordance with refrigerant quantity expected to be collected from the refrigerant use devices 30 and refrigerant quantity collected from the refrigerant use devices 30, which are included in the second information generated from the first information and stored in the storage unit 22. Evaluation according to the present embodiment means at least one of discrimination among the workers, providing each of the workers with points, determination as to a good or bad mark for each of the workers, determination as to whether or not any service is providable to each of the workers, and determination as to what service is provided to the corresponding worker.

The evaluation unit 27 determines the service to be provided to the worker as to the refrigerant used in the refrigerant use device 30 in accordance with a result of evaluation of the worker. For example, the evaluation unit 27 calculates quantity suppliable to the worker, of at least one of the refrigerant collected from the refrigerant use devices 30 and regenerated, and a newly manufactured refrigerant to be used in the refrigerant use devices 30. In this case, the service provided to the worker relates to refrigerant supply.

The storage unit 22 is an auxiliary storage device such as an HDD or an SSD. The storage unit 22 stores the first information acquired by the acquisition unit 21 and the second information generated from the first information. As depicted in FIG. 4, the storage unit 22 includes a device information database DB1, a refrigerant information database DB2, an account information database DB3, an account management database DB4, an event information database DB5, and a refrigerant management information database DB6.

The transmission unit 24 and the receiver unit 25 are network devices. The transmission unit 24 transmits, to the manager S or the corresponding worker, the first information or the second information generated by the generation unit 23. Specifically, the transmission unit 24 exemplarily transmits the first information or the second information to the terminal or the like used by the manager S or the corresponding worker. The receiver unit 25 receives data from input terminals 10*a*, 10*b*, . . . and the manager terminal 80 via the network 90.

(2-4) Details of management server (2-4-1) Database

Description is made to the databases included in the storage unit 22 of the management server 20.

FIG. 5 is an explanatory chart of the device information database DB1. The device information database DB1 stores information on the refrigerant use devices 30 registered to the refrigerant management system 100. The device information database DB1 has records each including at least a device ID, a model name, a device manufacturer ID, a refrigerant type, refrigerant already filled quantity, and ability information. The device ID may be used as a main key of the device information database DB1.

The device ID is assigned to the refrigerant use device 30 for registration of the refrigerant use device 30 to the refrigerant management system 100. The device ID may be a manufacturer's serial number or the like of the refrigerant use device 30. The model name has a character string indicating the model of the refrigerant use device 30. The device manufacturer ID is a worker ID assigned to the device manufacturer C6 having manufactured the refrigerant use device 30. The refrigerant type has a character string indicating the type of the refrigerant used in the refrigerant use device 30. The refrigerant already filled quantity is refrigerant quantity preliminarily filled in the refrigerant use device 30. The refrigerant quantity is indicated by means of weight of the refrigerant. The refrigerant quantity has a unit of kilogram. The ability information is horsepower of the refrigerant use device 30.

The device information database DB1 stores device information registered to the management server 20 upon device manufacture or device shipment by the device manufacturer C6. Device information not registered in the device information database DB1 can be registered through access to the management server 20 by the installation worker C1 or the maintenance worker C2.

The management server 20 according to the present embodiment holds the device information database DB1 in the storage unit 22. The management server 20 may alternatively access a database held by the device manufacturer C6 via the network to acquire the device information.

The refrigerant information database DB2 stores information on the cylinder used for flowing of the refrigerant registered to the refrigerant management system 100. The refrigerant information database DB2 has records each including at least a cylinder ID, a distribution worker ID, a refrigerant type, and refrigerant quantity.

The account information database DB3 stores information on the workers and the manager registered to the refrigerant management system 100. The account information database DB3 has records each including at least a worker ID, a worker name, work contents, and the login ID. The worker ID is assigned to the worker for registration of the first worker C1 or the like to the refrigerant management system 100. The management server 20 assigns the worker ID to each of the workers so as to avoid duplication between a worker ID to be registered and the worker ID assigned to the already registered worker. The work contents have a character string indicating work contents such as installation, maintenance, or the like. The login ID is used for access to the management server 20 by the worker. The login ID and the worker ID are associated with each other and are stored in the account information database DB3.

The account management database DB4 stores authority additional information on each of the workers registered to the refrigerant management system 100. Specifically, the account management database DB4 stores, for each of the workers, the work contents, access authority for information stored in the storage unit 22, and information on work authority with access to the management server 20. FIG. 6 is a chart indicating work contents for respective workers. FIG. 6 indicates work types allowed to each of the workers. Distribution, installation, maintenance, collection, regeneration, and discard in FIG. 6 indicate work executed by the worker in the distribution process, the installation process, the maintenance process, the collection process, the regeneration process, and the discard process in FIG. 1, respectively.

For example, the first worker C1 having a worker ID "CA006" in FIG. 6 can execute installation, maintenance, and collection. In this case, the management server 20 determines that the first worker C1 is accessible to the device information database DB1 or the like registered to the management server 20 in accordance with the work types allowed to the first worker C1. In response to a request from the first worker C1, the management server 20 reads predetermined data from the device information database DB1 or the like and transmits the read data to the input terminal 10*a* of the first worker C1.

For example, the regeneration worker C4 having a worker ID "GA019" in FIG. 6 can execute only regeneration. In this case, the management server 20 determines that the regeneration worker C4 is inaccessible to the device information database DB1 or the like registered to the management server 20 in accordance with the work type allowed to the regeneration worker C4.

The event information database DB5 stores work contents executed by the workers registered to the refrigerant management system 100. The event information database DB5 has records each including at least the work contents, a property ID, a device owner ID, the device ID, a device installation site, and refrigerant additionally filled quantity. The property ID is assigned to a property where target work is executed. The device owner ID is assigned to an owner of the refrigerant use device 30. The device ID is assigned to a device as a work target. The device installation site has a character string indicating an address of the property where target work is executed. The refrigerant additionally filled quantity is refrigerant quantity additionally filled in the device or the refrigerant pipe upon execution of target work.

The refrigerant management information database DB6 stores the first information and the second information.

(2-4-2) Method of acquiring refrigerant already filled quantity

Figure 7:
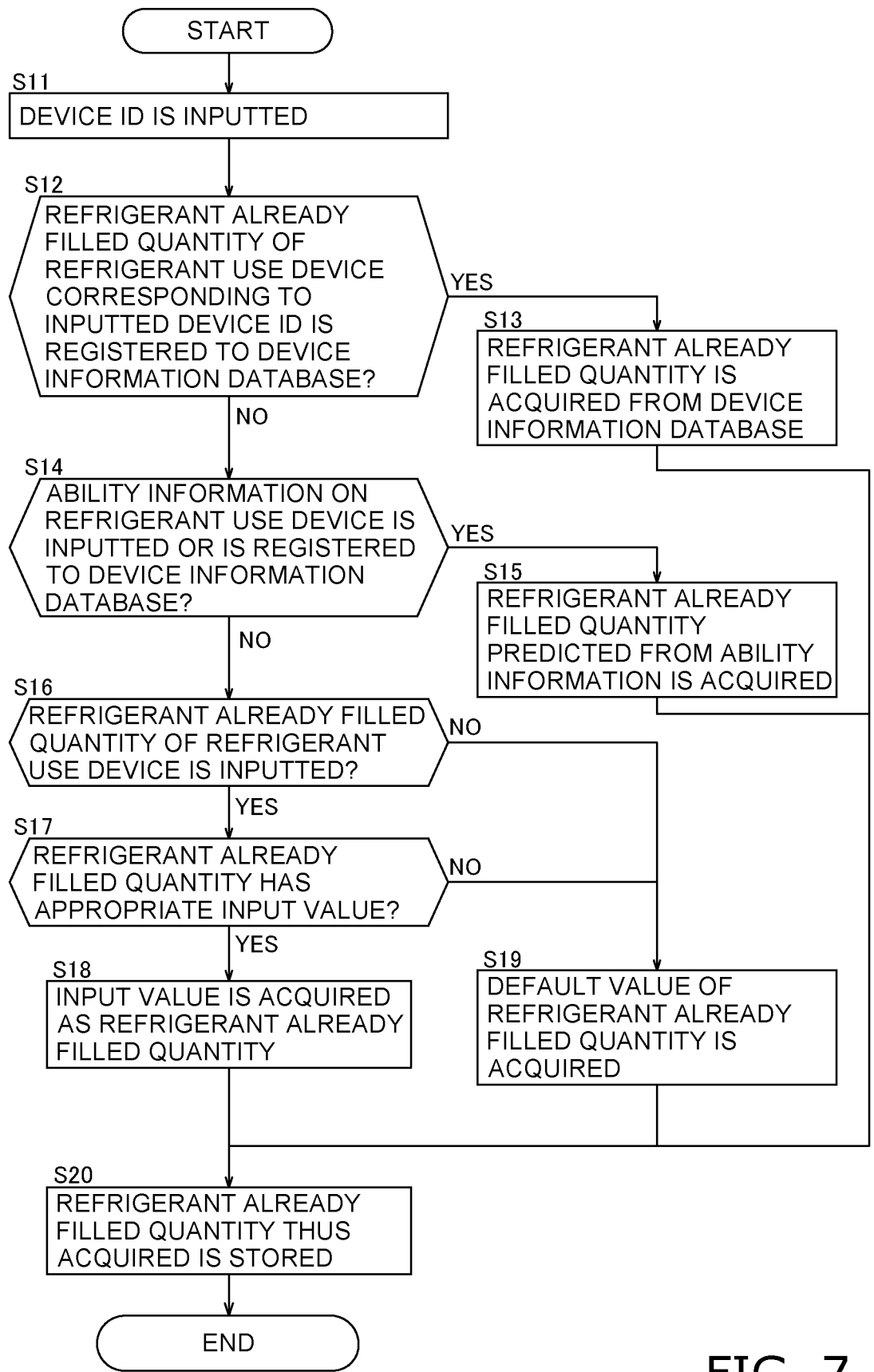
FIG. 7 is a flowchart depicting acquisition of refrigerant already filled quantity.

The acquisition unit 21 in the management server 20 acquires refrigerant already filled quantity that is refrigerant quantity filled in the refrigerant use device 30 as a work target of each of the workers upon shipment. FIG. 7 is a flowchart depicting acquisition of the refrigerant already filled quantity FIG. 7 includes processing in step S11 to step S20. Acquisition of the refrigerant already filled quantity is executed when each of the workers accesses the management server 20 and registers work contents, and upon generation of the second information by the generation unit 23 in the management server 20.

When each of the workers accesses the management server 20 and starts registration of work contents, a flow depicted in FIG. 7 starts. In step S11, the worker operates a corresponding one of the input terminals 10a, 10b, . . . to input, to the management server 20, the device ID of the refrigerant use device 30 as a target of acquisition of refrigerant already filled quantity Processing in step S12 to step S19 is executed by the acquisition unit 21 in the management server 20.

Step S12 involves determination of whether or not refrigerant already filled quantity of the refrigerant use device 30 corresponding to the device ID inputted in step S11 is registered to the device information database DB1. When registration is determined in step S12, the refrigerant already filled quantity of the refrigerant use device 30 is acquired from the device information database DB1 in step S13. When no registration is determined in step S12, determined in step S14 is whether or not there is inputted input data including ability information on the refrigerant use device 30, or whether or not the ability information on the refrigerant use device 30 is registered to the device information database DB1.

When determined in step S14 that there is inputted the input data including the ability information or that the ability information is registered to the device information database DB1, in step S15, refrigerant already filled quantity is predicted in accordance with the ability information included in the input data or the ability information being registered, and a predictive value is acquired as the refrigerant already filled quantity. For example, the refrigerant already filled quantity is acquired with prediction that the refrigerant already filled quantity is 20 kg when ability is 8 horsepower, the refrigerant already filled quantity is 21 kg when the ability is 10 horsepower, the refrigerant already filled quantity is 23 kg when the ability is 12 horsepower, and the refrigerant already filled quantity is 24 kg when the ability is 14 horsepower. When determined that there is inputted no input data including the ability information and the ability information is not registered to the device information database DB1 in step S14, determined in step S16 is whether or not there is inputted the refrigerant already filled quantity of the refrigerant use device 30. When determined that there is inputted in step S16, it is determined in step S17 whether or not an input value of the refrigerant already filled quantity is appropriate. For example, it is determined whether or not the refrigerant already filled quantity is within a predetermined range. The predetermined range may be set from 18 kg to 26 kg with a margin to a predictive value according to the ability information described above. When the input value is determined as being appropriate in step S17, the input value is acquired as the refrigerant already filled quantity in step S18.

When determined that there is not inputted in step S16 or when the input value is determined as being inappropriate in step S17, a default value of the refrigerant already filled quantity is acquired in step S19. In step S20, the storage unit 22 in the management server 20 stores the refrigerant already filled quantity acquired in step S13, step S15, step S18, and step S19 as refrigerant already filled quantity of the refrigerant use device 30.

(2-5) First information and second information

Description is made to the first information and the second information as data treated by the management server 20.

The workers operate the input terminals 10a, 10b, . . . to access the management server 20, and input data necessary for predetermined format prepared by the management server 20. The first information is acquired by the management server 20 in accordance with data inputted by the worker.

The second information associates refrigerant used quantity that is refrigerant quantity used in the refrigerant use device 30 with worker information acquired as first information. The "refrigerant used in the refrigerant use device 30" indicates the refrigerant filled and used in the refrigerant use device 30, and the refrigerant filled in the refrigerant pipe connected to the refrigerant use device 30. The acquisition unit 21 in the management server 20 acquires the refrigerant used quantity by totaling the refrigerant already filled quantity and the refrigerant additionally filled quantity.

Described next is the first information acquired by the management server 20 in accordance with data inputted to the management server 20 through operation of the input terminal 10a, the input terminal 10b, and the input terminal 10c by the first worker C1, the regeneration worker C4, and the distribution worker C5, respectively, and the second information generated from the first information.

For more comprehensible description, hereinafter as necessary, the first worker C1 as an installation worker will be called the installation worker C1, the first worker C1 as a maintenance worker will be called the maintenance worker C1, and the first worker C1 as a collection worker will be called the collection worker C1.

Figure 8:
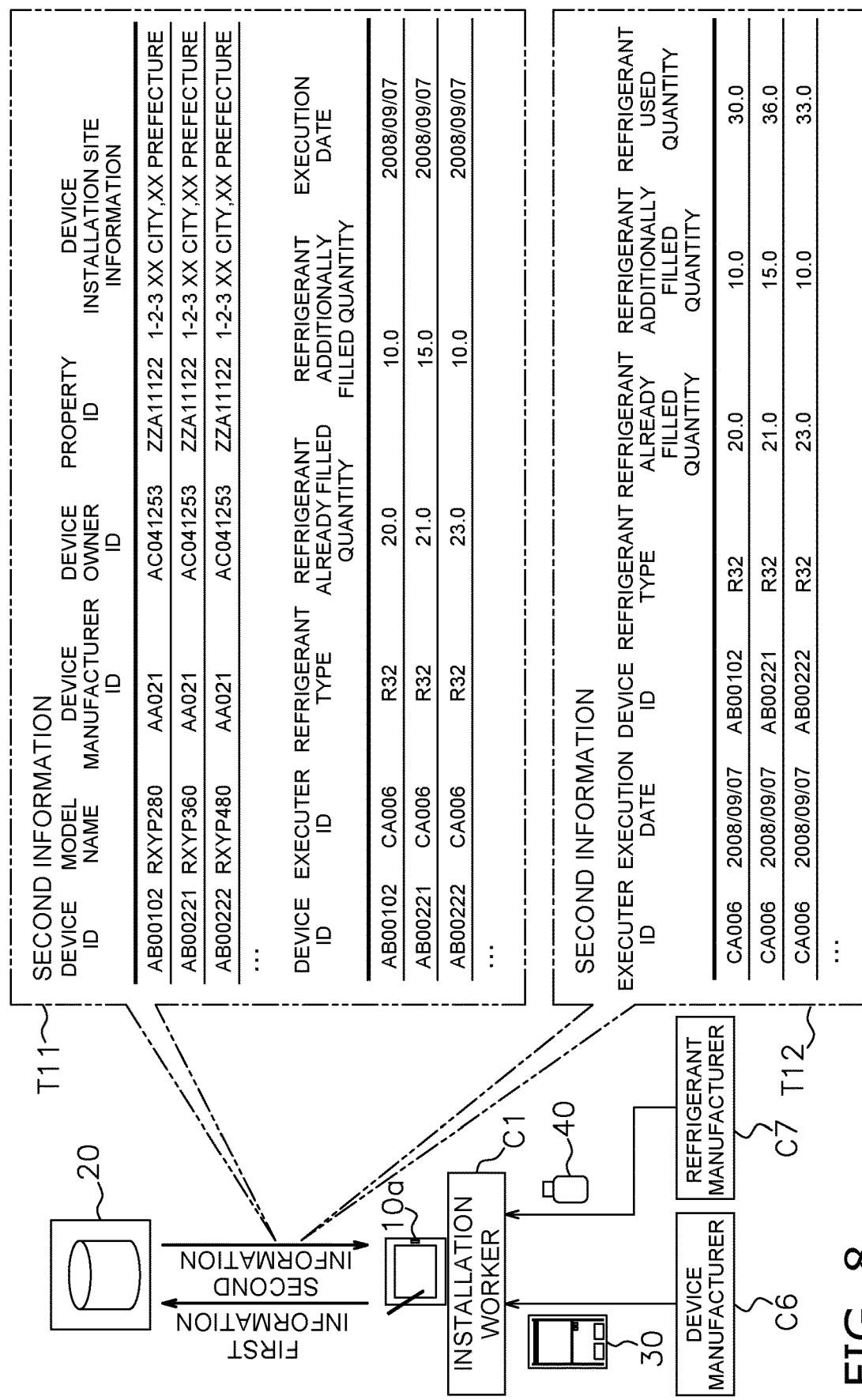
FIG. 8 is an explanatory view of second information generated from first information acquired by the management server 20 upon input of an installation worker C1.

(2-5-1) First information acquired by management server upon input of installation worker, and second information generated from first information FIG. 8 is an explanatory view of second information T11 and T12 generated from the first information acquired by the management server 20 upon input of the installation worker C1. The installation worker C1 inputs installation information to the management server 20 upon completion of installation After logging in the management server 20, the first worker C1 selects installation as an executed work type, and inputs as the installation worker C1 to the management server 20, the device ID, the device owner ID, the property ID, device installation site information, and the refrigerant additionally filled quantity. Such data pieces being inputted are stored in the event information database DB5 in the storage unit 22.

The first information acquired by the management server 20 upon input of the installation worker C1 includes at least device specifying information, worker information, and refrigerant additionally filled quantity information. The device specifying information is used for specifying the refrigerant use device 30, and corresponds to the device ID according to the present embodiment. The worker information relates to the worker executing work relevant to the refrigerant use device 30, and corresponds to the worker ID described in an executer ID in the present example. The refrigerant additionally filled quantity information relates to the refrigerant additionally filled quantity that is refrigerant quantity additionally filled in the refrigerant use device 30 or the refrigerant pipe connected to the refrigerant use device 30.

The management server 20 acquires the worker ID stored in the account information database DB3 in accordance with the login ID of the installation worker C1 when the installation worker C1 logs in the management server 20, and stores the worker ID as the executer ID.

The management server 20 acquires information on the model name and the device manufacturer from the device information database DB1 in accordance with the device ID inputted by the installation worker C1. The management server 20 further acquires the refrigerant already filled quantity through a process of acquiring the refrigerant already filled quantity in FIG. 7.

When the management server 20 determines registration of the installation information after the installation worker C1 inputs the installation information to the management server 20, the management server 20 acquires a date of registration of the installation information as an execution date.

When the property ID is registered to the event information database DB5, the management server 20 can acquire the device installation site information from the property ID. In this case, the management server 20 may acquire the device installation site information from the property ID.

The generation unit 23 in the management server 20 acquires information on the refrigerant already filled quantity or the like subsequently to the first information acquired upon input of the installation worker C1, generates the second information T11 and T12 as indicated in FIG. 8, and stores the second information thus generated in the refrigerant management information database DB6.

The second information T12 indicated in FIG. 8 associates the refrigerant used quantity and the executer ID included in the second information T11. FIG. 8 further exemplifies, as the second information T12, the execution date, the device ID, the refrigerant type, the refrigerant already filled quantity, and the refrigerant additionally filled quantity included in the second information T11.

Figure 9:
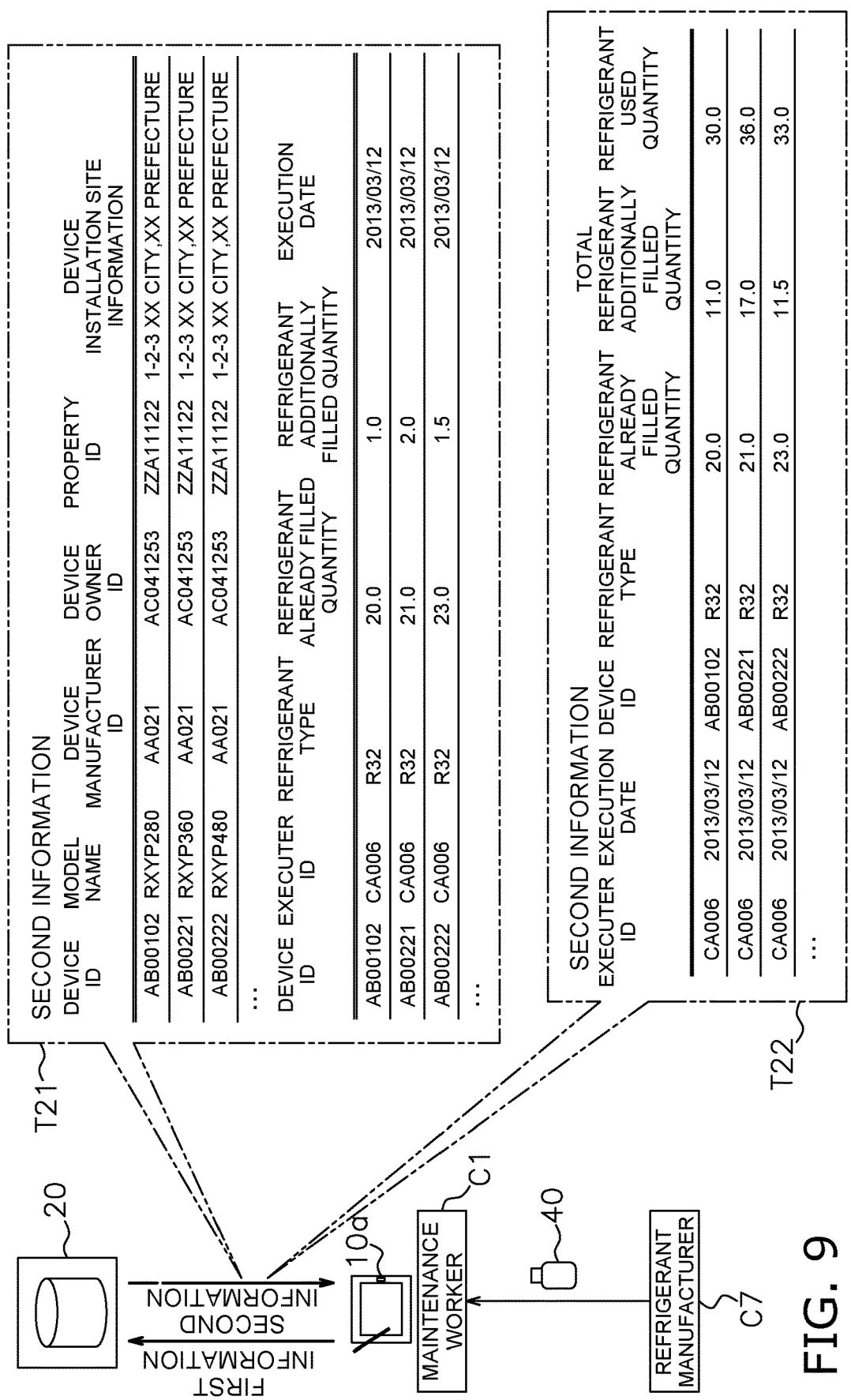
FIG. 9 is an explanatory view of second information generated from first information acquired by the management server 20 upon input of a maintenance worker C1.

(2-5-2) First Information Acquired by Management Server Upon Input of Maintenance Worker, and Second Information Generated from First Information FIG. 9 is an explanatory view of second information T21 and T22 generated from the first information acquired by the management server 20 upon input of the maintenance worker C1. The maintenance worker C1 inputs maintenance information to the management server 20 upon completion of maintenance. After logging in, the first worker C1 selects maintenance as an executed work type, and inputs as the maintenance worker C1 to the management server 20, the device ID, the device owner ID, the property ID, and the refrigerant additionally filled quantity. Such data pieces being inputted are stored in the event information database DB5 in the storage unit 22.

The first information acquired by the management server 20 upon input of the maintenance worker C1 includes at least the device specifying information, the worker information, and the refrigerant additionally filled quantity information.

When the management server 20 determines registration of the maintenance information after the maintenance worker C1 inputs the maintenance information to the management server 20, the management server 20 acquires a date of registration of the maintenance information as an execution date.

The generation unit 23 in the management server 20 acquires information on the refrigerant already filled quantity or the like acquired from the second information T11 and T12 prepared during installation and the maintenance information inputted during maintenance, generates the second information T21 and T22 as indicated in FIG. 9, and stores the second information thus generated in the refrigerant management database DB6.

The second information T22 is automatically generated by the generation unit 23 in the management server 20 in accordance with the second information T21. The maintenance worker C1 can acquire the second information T22 from the management server 20 with use of the input terminal 10a. The second information T22 includes at least information associating the refrigerant used quantity with the worker. The refrigerant used quantity is refrigerant quantity used in the refrigerant use device 30 during maintenance. The refrigerant used quantity in the second information T22 corresponds to total refrigerant quantity filled in the refrigerant use device 30 after the maintenance worker C1 additionally fills the refrigerant use device 30 with the refrigerant. The refrigerant used quantity is thus equal in quantity to the refrigerant used quantity upon completion of installation Additional refrigerant filling during maintenance indicates leakage of the refrigerant in the refrigerant use device from installation to maintenance. Even when the refrigerant is additionally filled during maintenance, the refrigerant used quantity after additional filling is equal to quantity upon completion of installation.

The second information T22 indicated in FIG. 9 associates the refrigerant used quantity with the executer ID included in the second information T21. FIG. 9 further exemplifies, as the second information T22, the execution date, the device ID, the refrigerant type, and the refrigerant already filled quantity included in the second information T21. FIG. 9 exemplifies total refrigerant additionally filled quantity as the second information T22. The total refrigerant additionally filled quantity corresponds to refrigerant quantity additionally filled during installation and refrigerant quantity additionally filled during maintenance. The total refrigerant additionally filled quantity is calculated from refrigerant quantity additionally filled during past work, through acquisition, from the event information DB5, of past work history on the device ID inputted as the maintenance information.

When the installation worker and the maintenance worker are identical as in the present embodiment, the management server 20 may recognize that these workers are identical upon login to the management server 20, and may cause the maintenance worker to select a maintenance target device or property when the maintenance worker selects maintenance as the executed work type. In this case, the management server 20 can acquire the device ID and the property ID from the event information DB5, so that the maintenance worker may have only to input the refrigerant additionally filled quantity. The maintenance worker C1 may register maintenance contents to the management server. The maintenance contents indicate specific contents of maintenance and management of the refrigerant use device 30 executed by the maintenance worker C1. Examples of the maintenance contents include work of repairing a site causing refrigerant leakage when the refrigerant is found to leak from the refrigerant use device 30, work of replenishing the refrigerant when the refrigerant filled in the refrigerant use device 30 is found to be short in quantity, and work of replacing at least part of the refrigerant filled in the refrigerant use device 30.

Figure 10:
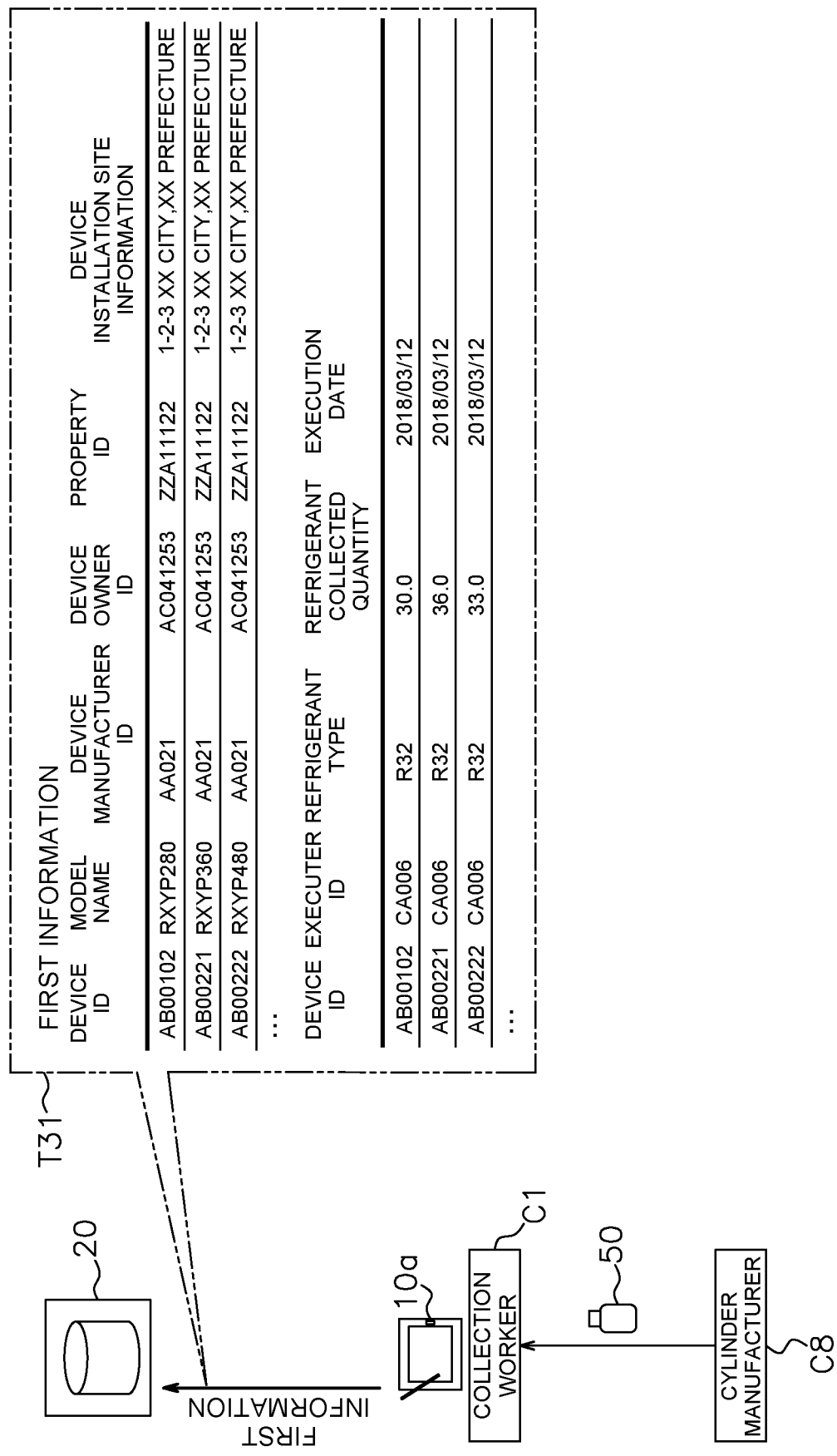
FIG. 10 is an explanatory view of first information acquired by the management server 20 upon input of a collection worker C1.

(2-5-3) First Information Acquired by Management Server Upon Input of Collection Worker FIG. 10 is an explanatory view of first information T31 acquired by the management server 20 upon input of the collection worker C1. The collection worker C1 inputs refrigerant collection information to the management server 20 upon completion of collection. After logging in, the first worker C1 selects collection as an executed work type, and inputs as the collection worker C1 to the management server 20, the device ID, the device owner ID, the property ID, and the refrigerant collected quantity. Such data pieces being inputted are stored in the event information database DB5 in the storage unit 22. The collection worker C1 receives a collection cylinder 50 from a cylinder manufacturer C8. The collection cylinder 50 is a container to be filled with the refrigerant collected from the refrigerant use device 30 by the collection worker C1. When the collection worker C1 receives the collection cylinder 50 from the cylinder manufacturer C8, the collection cylinder 50 is not filled with any refrigerant.

The first information T31 acquired by the management server 20 upon input of the collection worker C1 includes at least the device specifying information, the worker information, and refrigerant collected quantity information. The refrigerant collected quantity information includes refrigerant collected quantity obtained by totaling refrigerant quantity filled in the refrigerant use device 30 to be collected and refrigerant quantity collected from the refrigerant pipe connected to the refrigerant use device 30. The collected refrigerant is filled in the collection cylinder 50, and the collection cylinder 50 filled with the refrigerant and the refrigerant use device 30 are delivered to the regeneration worker C4 or the refrigerant discard worker C9.

When the management server 20 determines registration of the refrigerant collection information after the collection worker C1 inputs the collection information to the management server 20, the management server 20 acquires a date of registration of the refrigerant collection information as an execution date.

The management server 20 acquires information on the refrigerant collected quantity or the like from the second information T11, T12, T21, and T22 prepared during installation or maintenance and the collection information inputted by the collection worker C1 upon collection, generates the first information T31 as indicated in FIG. 10, and stores the first information in the refrigerant management database DB6.

Figure 11:
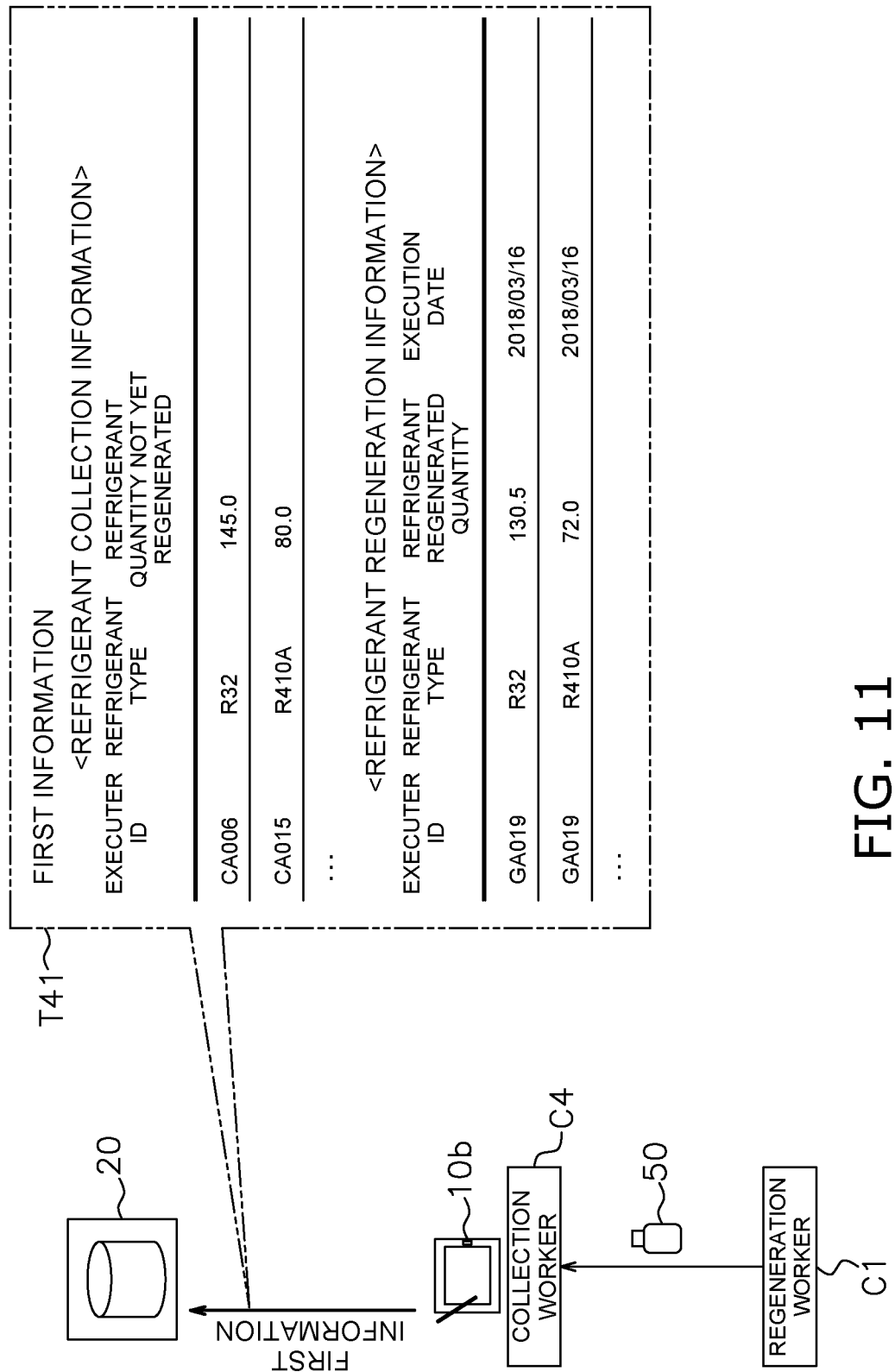
FIG. 11 is an explanatory view of first information acquired by the management server 20 upon input of a regeneration worker C4.

When the installation worker, the maintenance worker, and the collection worker are identical as in the present embodiment, the management server 20 may recognize that these workers are identical upon login to the management server 20, and may cause the collection worker to select a collection target device or property when the collection worker selects collection as the executed work type. In this case, the management server 20 can acquire the device ID and the property ID from the event information DB5, so that the collection worker may have only to input the refrigerant collected quantity (2-5-4) First Information Acquired by Management Server Upon Input of Regeneration Worker FIG. 11 is an explanatory view of first information T41 acquired by the management server 20 upon input of the regeneration worker C4. The regeneration worker C4 inputs regeneration information to the management server 20 upon completion of regeneration. The regeneration worker C4 receives the refrigerant use device 30 or the collection cylinder 50 from the collection worker C1. The regeneration worker C4 extracts the entire refrigerant collected by the collection worker C1 from the refrigerant use device 30 or the collection cylinder 50, regenerates the refrigerant thus extracted, and fills a refrigerant container 60 with the refrigerant thus regenerated. The refrigerant container 60 is a dedicated container to be filled with the regenerated refrigerant. Examples of the refrigerant container 60 include a large cylinder or a tanker. The regeneration worker C4 delivers the refrigerant container 60 filled with the regenerated refrigerant to the distribution worker C5.

As indicated in FIG. 11, the first information T41 acquired by the management server 20 upon input of the regeneration worker C4 includes at least the refrigerant collection information and refrigerant regeneration information. The refrigerant collection information relates to the refrigerant not yet regenerated by the regeneration worker C4. The refrigerant regeneration information relates to the refrigerant having been regenerated by the regeneration worker C4.

The refrigerant collection information includes at least the executer ID as the worker ID of the collection worker C1, the refrigerant type, and refrigerant quantity not yet regenerated. The refrigerant type is the type of the refrigerant filled in the collection cylinder 50 or the refrigerant use device 30. The refrigerant collected quantity is refrigerant quantity collected by the collection worker C1. The refrigerant collection information has data for each collection worker C1 and for each refrigerant type. Refrigerant quantity filled in the refrigerant use device 30 having been collected may not be accurate. The refrigerant quantity not yet regenerated is thus set as refrigerant quantity actually collected from the refrigerant use device 30 by the regeneration worker C4.

The refrigerant regeneration information includes at least the executer ID as the worker ID of the regeneration worker C4, the refrigerant type, the refrigerant regenerated quantity, and an executed date. The refrigerant type indicates the type of the refrigerant regenerated by the regeneration worker C4. The refrigerant regenerated quantity corresponds to refrigerant quantity regenerated by the regeneration worker C4. The refrigerant regeneration information has data for each refrigerant type. The refrigerant regenerated quantity is less than the refrigerant quantity not yet regenerated. The refrigerant regenerated quantity is exemplarily about 90% of the refrigerant quantity not yet regenerated.

When the management server 20 determines registration of the refrigerant regeneration information after the regeneration worker C4 inputs the refrigerant regeneration information to the management server 20, the management server 20 acquires a date of registration of the refrigerant regeneration information as an execution date.

When the collection worker and the regeneration worker are different from each other as in the present embodiment, the management server 20 may provide the regeneration worker C4 with the device ID, the cylinder ID, the property ID, or the like as the second information after the regeneration worker C4 logs in the management server 20. The management server 20 acquires the second information provided to the regeneration worker C4 and information on the refrigerant regenerated quantity or the like inputted upon regeneration, and generates the first information T41 as indicated in FIG. 11 and stores the first information in the refrigerant management database DB6.

Figure 12:
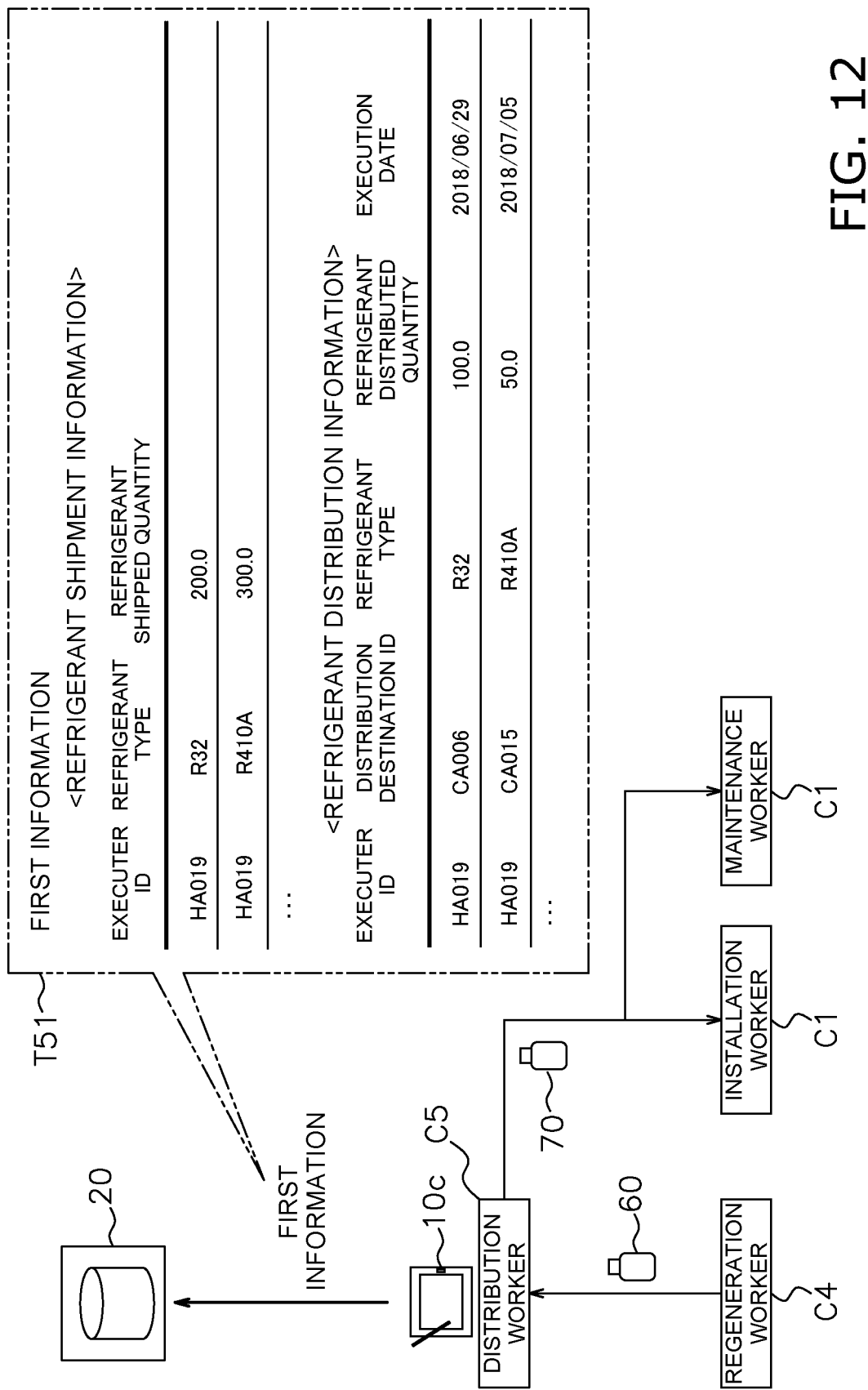
FIG. 12 is an explanatory view of first information acquired by the management server 20 upon input of a distribution worker C5.

(2-5-5) First information acquired by management server upon input of distribution worker FIG. 12 is an explanatory view of first information T51 acquired by the management server 20 upon input of the distribution worker C5. The distribution worker C5 inputs distribution information to the management server 20 upon completion of distribution. The distribution worker C5 receives the refrigerant container 60 from the refrigerant manufacturer C7 or the regeneration worker C4. The refrigerant container 60 received by the distribution worker C5 is filled with the refrigerant manufactured by the refrigerant manufacturer C7 or the refrigerant regenerated by the regeneration worker C4. The distribution worker C5 fills a refrigerant cylinder 40 or a regeneration cylinder 70 with the refrigerant filled in the refrigerant container 60. The distribution worker C5 distributes, to the first worker C1 (the installation worker C1 or the maintenance worker C1) as necessary, the refrigerant cylinder 40 or the regeneration cylinder 70 filled with the refrigerant.

As indicated in FIG. 12, the first information T51 acquired by the management server 20 upon input of the distribution worker C5 includes at least refrigerant shipment information and refrigerant distribution information. The refrigerant shipment information relates to the refrigerant filled in the refrigerant cylinder 40 or the regeneration cylinder 70 and shipped by the distribution worker C5. The refrigerant distribution information relates to the refrigerant distributed to the first worker C1 by the distribution worker C5.

The refrigerant shipment information includes at least the executer ID as the worker ID of the distribution worker C5, the refrigerant type, and refrigerant shipped quantity. The refrigerant type indicates the type of the refrigerant shipped by the distribution worker C5. The refrigerant shipped quantity corresponds to refrigerant quantity shipped by the distribution worker C5. The refrigerant shipment information has data for each refrigerant type.

The refrigerant distribution information includes at least the executer ID as the worker ID of the distribution worker C5, a distribution destination ID, the refrigerant type, refrigerant distributed quantity, and an executed date. The distribution destination ID is the worker ID of the first worker C1 having received a distributed refrigerant. The refrigerant type indicates the type of the refrigerant distributed by the distribution worker C5. The refrigerant distributed quantity corresponds to refrigerant quantity distributed by the distribution worker C5. The refrigerant distribution information has data for each distribution destination ID and for each refrigerant type. When the management server 20 determines registration of the refrigerant distribution information after the distribution worker C5 inputs the refrigerant distribution information to the management server 20, the management server 20 acquires a date of registration of the refrigerant distribution information as an execution date.

The management server 20 acquires the information inputted by the distribution worker C5 and information such as the execution date registered by the management server 20, and generates the first information T51 as indicated in FIG. 12 and stores the first information in the refrigerant management database DB6.

(2-6) Second Information with Access Authority Only for Manager

The management server 20 generates second information T92 relevant to refrigerant quantity treated by each worker in accordance with the first information and the second information stored in the refrigerant management information database DB6. The management server 20 resisters the second information T92 thus generated to the refrigerant management information database DB6 in the storage unit 22. The worker can check the second information T92 stored in the management server 20 with use of a corresponding one of the input terminals 10a, 10b, . . . . The second information that the worker can check is the second information with access authority to the worker, and examples thereof include the second information T11, T12, T21, T22, . . . generated from the first information acquired by the management server 20 in accordance with data inputted to the management server 20 by the worker. The manager S can check all the second information stored in the management server 20 with use of the manager terminal 80. The management server 20 generates, in addition to the second information indicated in FIG. 8 and FIG. 9, the second information T92 with access authority only to the manager S in accordance with the first information thus acquired.

FIG. 13 is an explanatory chart exemplifying the second information T92 on refrigerant quantity treated by each worker, with access authority only for the manager S. The second information T92 indicated in FIG. 13 associates the information on the worker with the information on the refrigerant used in the refrigerant use device 30 as a work target of the worker in the entire refrigerant management system 100.

The "information on the worker" included in the second information T92 corresponds to the "worker ID" indicated in FIG. 13. The "information on the worker" is the worker ID of the first worker C1 or the like. Specific examples of the "worker ID" include the executers ID indicated in FIG. 8 to FIG. 12. FIG. 13 includes "CA006" and "CA015" as the workers ID of the first workers Cl to execute installation, maintenance, and collection. The worker ID "GA019" corresponds to the regeneration worker C4. The worker ID "HA019" corresponds to the distribution worker C5.

The second information T92 includes, as indicated in FIG. 13 as the "information on the refrigerant used in the refrigerant use device 30", the refrigerant type, refrigerant held quantity, the refrigerant used quantity, refrigerant to-be-collected quantity, the refrigerant collected quantity, the refrigerant regenerated quantity, refrigerant discarded quantity, refrigerant to-be-distributed quantity, and the refrigerant distributed quantity. The refrigerant type is a name indicating the type of the refrigerant flowing in the refrigerant circulation cycle. The information other than the refrigerant type relates to refrigerant quantity flowing in the refrigerant circulation cycle.

The refrigerant held quantity corresponds to total refrigerant quantity held by the worker.

The refrigerant used quantity corresponds to total refrigerant quantity used in the refrigerant use devices 30 by the worker, in the refrigerant held quantity. The refrigerant used in the refrigerant use device 30 by the worker corresponds to the refrigerant filled in the refrigerant use device 30 and the refrigerant pipe connected to the refrigerant use device 30. When the worker is the installation worker C1 or the maintenance worker C1, the refrigerant used quantity corresponds to total refrigerant quantity filled in all the refrigerant use devices 30 as work targets and the refrigerant pipes connected to the refrigerant use devices 30. The refrigerant used quantity has a value obtained by subtracting, from the refrigerant held quantity, refrigerant quantity held in the refrigerant cylinder 40 and the refrigerant quantity held in the regeneration cylinder 70 by the worker. The refrigerant used quantity is calculated in accordance with the "refrigerant used quantity" included in the second information T11, T12, T21, T22, . . . or the like indicated in FIG. 8 and FIG. 9.

The refrigerant to-be-collected quantity corresponds to total refrigerant quantity expected to be collected from the refrigerant use devices 30 within a predetermined period by the collection worker C1, in the refrigerant used quantity of the installation worker C1 or the maintenance worker C1. The acquisition unit 21 acquires the refrigerant to-be-collected quantity in accordance with the first information. The refrigerant to-be-collected quantity is exemplified by total refrigerant quantity filled in the refrigerant use device 30 after elapse of the predetermined period since installation or start of use. The predetermined period is set in accordance with the type of the refrigerant being used, the model of the refrigerant use device 30, and the like. For example, the refrigerant filled in the refrigerant use device 30 after elapse of 15 years since an installation execution date and the refrigerant pipe connected to the refrigerant use device 30 is treated as a refrigerant to be collected.

Specifically, the acquisition unit 21 acquires the refrigerant to-be-collected quantity in accordance with third information included in the first information. The third information relates to an execution date. The execution date corresponds to a work day or a work month. The work day corresponds to a day of registration of at least one of the installation information and the maintenance information. The work month corresponds to a month of registration of at least one of the installation information and the maintenance information.

The refrigerant collected quantity corresponds to total refrigerant quantity collected from the refrigerant use device 30 by the collection worker C1. The refrigerant collected quantity is calculated in accordance with the "refrigerant quantity not yet regenerated" included in the first information T41 indicated in FIG. 11 and the refrigerant collected quantity included in the first information T31 indicated in FIG. 10.

According to the present embodiment, the installation worker C1, the maintenance worker C1, and the collection worker C1 are the identical worker C1. When the worker is the first worker C1, the second information T92 includes, as information on refrigerant quantity, the refrigerant collected quantity in addition to the refrigerant used quantity and the refrigerant to-be-collected quantity.

The refrigerant regenerated quantity corresponds to total refrigerant quantity regenerated by the regeneration worker C4. The refrigerant regenerated quantity is calculated in accordance with the "refrigerant regenerated quantity" included in the first information T41 indicated in FIG. 11 or the like.

The refrigerant discarded quantity corresponds to total refrigerant quantity not regenerated but discarded by the regeneration worker C4.

The refrigerant to-be-distributed quantity corresponds to total refrigerant quantity to be distributed by the distribution worker C5. In an exemplary case where the installation worker C1 and the maintenance worker C1 issues application relevant to refrigerant distribution to the distribution worker C5, the refrigerant to-be-distributed quantity is calculated in accordance with contents of the application. Examples of the application contents include refrigerant quantity distributed in the past, a recent refrigerant distribution date, and a reason for application for refrigerant distribution.

The refrigerant distributed quantity corresponds to total refrigerant quantity distributed by the distribution worker C5 to the installation worker C1 or the maintenance worker C1. The refrigerant distributed quantity is calculated in accordance with the "refrigerant distributed quantity" included in the first information T51 indicated in FIG. 12 or the like.

The refrigerant quantity included in the second information T92 may correspond to quantity for each of the refrigerant use devices 30. In this case, the second information T92 may associate the device ID of the refrigerant use device 30 with the refrigerant used quantity used in the refrigerant use device 30.

As described above, the second information T92 corresponds to information associating the information on the worker to execute work relevant to the refrigerant use device 30 with the refrigerant quantity used in the refrigerant use device 30 as a work target of the worker, and corresponds to information associating the information on the refrigerant use device 30 with the refrigerant quantity used in the refrigerant use device 30.

(2-7) Evaluation of Worker

The evaluation unit 27 evaluates the worker in accordance with the first information including the device specifying information and the worker information, according to at least one of the number of the refrigerant use devices 30 serving as work targets of the worker and the refrigerant used quantity that is refrigerant quantity used in the refrigerant use devices 30 serving as the work targets of the worker. The evaluation unit 27 generates the second information associating the refrigerant used quantity and the worker from the first information, and evaluates the worker in accordance with the second information.

Specifically, the evaluation unit 27 evaluates the worker in accordance with the refrigerant quantity expected to be collected from the refrigerant use devices 30 and the refrigerant quantity collected from the refrigerant use devices 30, which are included in the second information T92 indicated in FIG. 13. The refrigerant quantity expected to be collected from the refrigerant use devices 30 is refrigerant quantity currently held by the worker and estimated to be collected, and corresponds to the "refrigerant to-be-collected quantity" indicated in FIG. 13. The refrigerant quantity collected from the refrigerant use devices 30 is refrigerant quantity actually collected from the worker, and corresponds to the "refrigerant collected quantity" indicated in FIG. 13. The evaluation unit 27 evaluates the worker in accordance with the refrigerant to-be-collected quantity, the refrigerant collected quantity, and the refrigerant distributed quantity included in the second information T92 or the like.

(2-8) Service Offered to Worker

The evaluation unit 27 further determines the service to be provided to the worker as to the refrigerant used in the refrigerant use device 30 in accordance with the second information T92 indicated in FIG. 13. The service determined by the evaluation unit 27 is exemplified by supplying the worker with the refrigerant.

Specifically, the evaluation unit 27 calculates refrigerant suppliable quantity for each of the workers, from the second information T92. The refrigerant suppliable quantity corresponds to refrigerant quantity suppliable to the worker. The refrigerant as a supply target is at least one of the refrigerant collected from the refrigerant use device 30 and regenerated, and a newly manufactured refrigerant. In an exemplary case where the evaluation unit 27 evaluates the workers by assigning priority orders to the workers, the evaluation unit 27 calculates the refrigerant suppliable quantity for each of the workers such that the refrigerant suppliable quantity is larger as the priority order is higher. Examples of the worker supplied with the refrigerant include the installation worker C1 and the maintenance worker C1.

The evaluation unit 27 calculates the refrigerant suppliable quantity in accordance with the refrigerant to-be-collected quantity, the refrigerant collected quantity, or the like. Specifically, the evaluation unit 27 calculates the refrigerant suppliable quantity for each of the workers in accordance with total quantity of the refrigerant to-be-collected quantity and the refrigerant collected quantity included in the second information T92, and the refrigerant distributed quantity included in the second information T92. The refrigerant distributed quantity corresponds to refrigerant quantity supplied to the worker.

The evaluation unit 27 subsequently provides the distribution worker C5 or the like with information on the refrigerant suppliable quantity calculated for each of the workers. The distribution worker C5 calculates refrigerant quantity to be distributed to each of the workers in accordance with the information on the refrigerant suppliable quantity calculated by the evaluation unit 27 in the management server 20, and supplies the worker with the refrigerant.

(3) Effects

3-1

In the refrigerant management system 100, the management server 20 can centrally grasp the refrigerant flowing in the refrigerant circulation cycle and can provide each of the workers with refrigerant information. Specifically, the management server 20 can generate the second information associating the refrigerant quantity used in the refrigerant use device 30 and the worker information from the first information acquired from the information inputted by each of the workers, and can provide the worker with the second information. The refrigerant management system 100 including the management server 20 can thus manage the refrigerant quantity flowing in the market in each process of the refrigerant circulation cycle.

Particularly in the refrigerant management system 100, the management server 20 can acquire the first information in the installation process by the installation worker C1 and in the maintenance process by the maintenance worker C1. The installation process and the maintenance process precede the collection process in which the collection worker C1 collects the refrigerant. In other words, the management server 20 can acquire the information on the refrigerant having been collected as well as the refrigerant not yet collected. The refrigerant management system 100 can thus manage even the refrigerant not yet collected by the collection worker C1, such as refrigerant quantity filled and used in the refrigerant use device 30. The manager S of the refrigerant management system 100 thus easily predicts future refrigerant collected quantity for a long-term planning of refrigerant management relevant to refrigerant manufacture, distribution, and the like. Furthermore, the manager S can smoothly manage the refrigerant quantity to be supplied to the installation worker C1 and the maintenance worker C1 within a refrigerant quantity range manufacturable by the refrigerant manufacturer C7 or the like, in accordance with the long-term planning of the refrigerant management.

3-2

The refrigerant management system 100 is configured to evaluate the workers using the refrigerant. In the refrigerant management system 100, the management server 20 can generate the second information associating the refrigerant quantity used in the refrigerant use device 30 and the worker information from the first information acquired from the information inputted by each of the workers, and can evaluate the worker in accordance with the second information. The refrigerant management system 100 including the management server 20 can thus appropriately supply the worker with the refrigerant to be used in the refrigerant use device 30 in accordance with the result of worker evaluation.

(4) Characteristics

4-1

There has been conventionally known a system configured to grasp or manage quantity of a refrigerant used in a refrigerant use device in accordance with information on the refrigerant having been delivered or to be delivered to a collection worker. However, such a system has difficulty in grasping or managing refrigerant quantity flowing in the market in each process of the refrigerant circulation cycle depicted in FIG. 1, and particularly has difficulty in grasping or managing refrigerant quantity not yet delivered to the collection worker.

In the refrigerant management system 100 according to the present embodiment, the acquisition unit 21 in the management server 20 acquires the first information during at least one of installation and maintenance of the refrigerant use device 30. The first information includes at least the device specifying information, the worker information, and the refrigerant additionally filled quantity information. The acquisition unit 21 acquires the refrigerant already filled quantity in accordance with the device specifying information in the first information, and acquires the refrigerant used quantity by totaling the refrigerant already filled quantity and the refrigerant additionally filled quantity included in the refrigerant additionally filled quantity information in the first information. The generation unit 23 in the management server 20 generates the second information associating the refrigerant used quantity and the worker from the refrigerant used quantity and the worker information in the first information.

The acquisition unit 21 can thus acquire the first information necessary for generation of the second information before collection of the refrigerant used in the refrigerant use device 30, in other words, in the installation process or the maintenance process in the refrigerant circulation cycle depicted in FIG. 1. The refrigerant management system 100 can thus acquire the information on the refrigerant not yet collected by the collection worker, and can manage the refrigerant quantity filled and used in each of the refrigerant use devices 30 in association with the worker.

The acquisition unit 21 can further gather the first information on the refrigerant flowing in the refrigerant circulation cycle in each of the processes of the refrigerant circulation cycle. The processes of the refrigerant circulation cycle include the manufacture process, the distribution process, the installation process, the maintenance process, the collection process, the regeneration process, and the discard process as depicted in FIG. 1. The generation unit 23 can generate the second information from the first information collected in each of the processes of the refrigerant circulation cycle.

The refrigerant management system 100 can thus manage the refrigerant quantity flowing in the market by generating the second information from the first information collected from the worker treating the refrigerant used in the refrigerant use device 30. The manager S of the refrigerant management system 100 can thus grasp the information on the refrigerant quantity flowing in the market with reference to the second information stored in the management server with use of the manager terminal 80, to acquire an appropriate production volume of refrigerant.

4-2

In the refrigerant management system 100 according to the present embodiment, the storage unit 22 in the management server 20 stores the refrigerant already filled quantity in association with the device specifying information, so that the acquisition unit 21 can acquire the refrigerant already filled quantity being stored in accordance with the device specifying information in the first information thus acquired.

The refrigerant management system 100 can thus acquire the refrigerant used quantity in accordance with only the first information.

4-3

In the refrigerant management system 100 according to the present embodiment, the acquisition unit 21 can acquire the ability information on the ability of the refrigerant use device 30 in accordance with the device specifying information in the first information thus acquired, and can acquire the refrigerant already filled quantity in accordance with the ability information thus acquired. The refrigerant management system 100 can thus acquire the predictive value of the refrigerant already filled quantity in accordance with the ability information preliminarily registered to the management server 20, even when the refrigerant already filled quantity of the refrigerant use device 30 is not registered to the management server 20.

4-4

In the refrigerant management system 100 according to the present embodiment, the acquisition unit 21 can acquire the input data including the ability information on the ability of the refrigerant use device 30, and can acquire the refrigerant already filled quantity in accordance with the ability information included in the input data. The refrigerant management system 100 can thus acquire the predictive value of the refrigerant already filled quantity in accordance with the ability information inputted to the management server 20 by the worker, even when the refrigerant already filled quantity of the refrigerant use device 30 is not registered to the management server 20.

4-5

As depicted in step S12 to step S15 in FIG. 7, the acquisition unit 21 in the refrigerant management system 100 according to the present embodiment can acquire the refrigerant already filled quantity in accordance with the device specifying information or the ability information. Specifically, the acquisition unit 21 acquires the refrigerant already filled quantity in accordance with the device specifying information in the first information thus acquired when the refrigerant already filled quantity is stored in association with the device specifying information, and acquires the predictive value of the refrigerant already filled quantity in accordance with the ability information acquired in accordance with the device specifying information in the first information thus acquired when the refrigerant already filled quantity is not stored in association with the device specifying information. The refrigerant management system 100 can thus acquire an appropriate value adopted as the refrigerant already filled quantity in accordance with the information registered to the management server 20.

4-6

In the refrigerant management system 100 according to the present embodiment, the acquisition unit 21 can acquire the total quantity of the refrigerant used quantity of the plurality of refrigerant use devices 30 serving as work targets of the worker, and the generation unit 23 can further generate, as the second information, the information associating the total quantity of the refrigerant used quantity and the worker. The refrigerant management system 100 can thus manage, in association with each of the workers, the refrigerant quantity filled and used in all the refrigerant use devices 30 serving as work targets of the worker.

4-7

In the refrigerant management system 100 according to the present embodiment, the acquisition unit 21 can acquire the refrigerant to-be-collected quantity that is refrigerant quantity to be collected from the refrigerant use devices 30 within the predetermined period, and the generation unit 23 can further generate, as the second information, the information associating the refrigerant to-be-collected quantity and the worker. The refrigerant management system 100 can thus manage the refrigerant quantity expected to be collected from the refrigerant use devices 30 serving as work targets of the installation worker and the maintenance worker.

4-8

In the refrigerant management system 100 according to the present embodiment, the acquisition unit 21 acquires the refrigerant to-be-collected quantity in accordance with the third information including the work day or the work month of registration of at least one of the installation information and the maintenance information. For example, the acquisition unit 21 acquires the refrigerant to-be-collected quantity in accordance with the refrigerant quantity used in the refrigerant use device 30 after elapse of the predetermined period since the work day or the work month included in the third information. The refrigerant management system 100 can thus apply the refrigerant to-be-collected quantity as an appropriate predictive value of the refrigerant quantity to be collected from the refrigerant use device 30 within the predetermined period.

4-9

The acquisition unit 21 in the refrigerant management system 100 acquires the first information in accordance with the data inputted by the worker to execute work relevant to the refrigerant use device 30. Specific examples of the worker include the first worker C1, the regeneration worker C4, and the distribution worker C5 as depicted in FIG. 1. These workers own the input terminals 10*a*, 10*b*, . . . for input of predetermined data to the management server 20. The workers can thus each input the predetermined data to the management server 20 with use of a corresponding one of the input terminals 10*a*, 10*b*, . . . during execution of or immediately after completion of work at a site of work execution relevant to the refrigerant used in the refrigerant use device 30.

4-10

In the refrigerant management system 100, the workers do not need to input all the information on work to the management server 20 to allow the acquisition unit 21 to acquire the first information. This configuration reduces time necessary for operation of the input terminals 10*a*, 10*b*, . . . and inhibits erroneous input.

4-11

In the refrigerant management system 100 according to the present embodiment, the acquisition unit 21 in the management server 20 acquires the first information during at least one of installation and maintenance of the refrigerant use device 30. The first information includes at least the device specifying information and the worker information. The evaluation unit 27 in the management server 20 evaluates the worker in accordance with the first information according to at least one of the number of refrigerant use devices 30 serving as work targets of the worker and the refrigerant used quantity that is refrigerant quantity used in the refrigerant use devices 30 serving as the work targets of the worker. The refrigerant management system 100 can thus appropriately supply the worker with the refrigerant to be used in the refrigerant use device 30 in accordance with the result of worker evaluation.

4-12

In the refrigerant management system 100 according to the present embodiment, the generation unit 23 in the management server 20 generates the second information associating the refrigerant used quantity and the worker from the first information, and the evaluation unit 27 evaluates the worker in accordance with the second information. The refrigerant management system 100 can thus appropriately calculate the refrigerant quantity suppliable to each of the workers in accordance with the refrigerant used quantity of the refrigerant use device 30 serving as a work target of the worker.

4-13

In the refrigerant management system 100 according to the present embodiment, the generation unit 23 generates, as the second information, information associating the refrigerant to-be-collected quantity calculated from the refrigerant used quantity and the worker, and the evaluation unit 27 evaluates the worker in accordance with refrigerant to-be-collected quantity in the second information. The refrigerant management system 100 can thus appropriately calculate the refrigerant quantity suppliable to each of the workers in accordance with the refrigerant quantity expected to be collected from the refrigerant use devices 30 serving as work targets of the installation worker and the maintenance worker.

4-14

In the refrigerant management system 100 according to the present embodiment, the acquisition unit 21 acquires the refrigerant collected quantity that is refrigerant quantity collected from the refrigerant use device 30, and the evaluation unit 27 evaluates the worker in accordance with the refrigerant collected quantity and the refrigerant to-be-collected quantity. The evaluation unit 27 calculates the refrigerant quantity suppliable to each of the workers.

In this case, as indicated in FIG. 13 or the like, the second information includes the refrigerant quantity expected to be collected from the refrigerant use device 30 (the refrigerant to-be-collected quantity) and the refrigerant quantity collected from the refrigerant use device 30 (the refrigerant collected quantity) The evaluation unit 27 can thus execute, in accordance with the second information or the like, evaluation as a reference for appropriate calculation of the refrigerant quantity suppliable to each of the workers within the range of the refrigerant quantity suppliable from the refrigerant management system 100. The refrigerant management system 100 can appropriately supply the refrigerant to the worker needing the refrigerant.

4-15

In the refrigerant management system 100, the evaluation unit 27 can assign the priority order to each of the workers in accordance with the second information T92 indicated in FIG. 13, and can calculate the refrigerant suppliable quantity for the worker in accordance with the priority order.

The refrigerant management system 100 can thus preferentially supply the worker involved in refrigerant collection with the regenerated refrigerant. In other words, the worker can be more preferentially supplied with the refrigerant as the refrigerant collected quantity is larger or the refrigerant quantity expected to be collected later is larger. The worker can thus be preferentially supplied with the refrigerant by being actively involved in refrigerant collection. In this case, the worker can be preferentially supplied with the refrigerant even before collection of the refrigerant from the refrigerant use device 30 used for own work.

The refrigerant management system 100 can urge the workers to be actively involved in refrigerant collection, and thus increase in refrigerant collected quantity and refrigerant regenerated quantity flowing in the market. The refrigerant management system 100 can accordingly suppress refrigerant quantity needed to be newly manufactured in the market.

4-16

In the market where total flowable refrigerant quantity is limited or gradually reduced in consideration of environment protection, increased demand for the refrigerant may lead to difficulty in refrigerant acquisition or increase in refrigerant price. In such a case, the worker to execute work relevant to the refrigerant use devices or the like will have an economic problem caused by increase in refrigerant price and a business problem with no prospect of stable refrigerant acquisition.

In the refrigerant management system 100, the evaluation unit 27 calculates the refrigerant suppliable quantity to enable supply and new manufacture of an appropriate quantity of refrigerant to the workers, or the like. The worker to execute work relevant to the refrigerant use devices can thus efficiently avoid the economic problem caused by increase in refrigerant price and the business problem with no prospect of stable refrigerant acquisition.

(5) Modification Examples (5-1) Modification Example A

In the regeneration process depicted in FIG. 1, the refrigerant regeneration worker regenerates the refrigerant collected by the collection worker. When the collected refrigerant cannot be regenerated, the collection worker or the regeneration worker may discard at least part of the collected refrigerant. Such at least part of the collected refrigerant may alternatively be discarded by a dedicated worker other than the collection worker or the regeneration worker. Examples of such a case where the collected refrigerant cannot be regenerated include a case where the refrigerant cannot be regenerated physically or chemically due to pollution, deterioration, or the like, and a case where refrigerant regeneration needs high cost and refrigerant regeneration is not practical for reuse.

Figure 14:
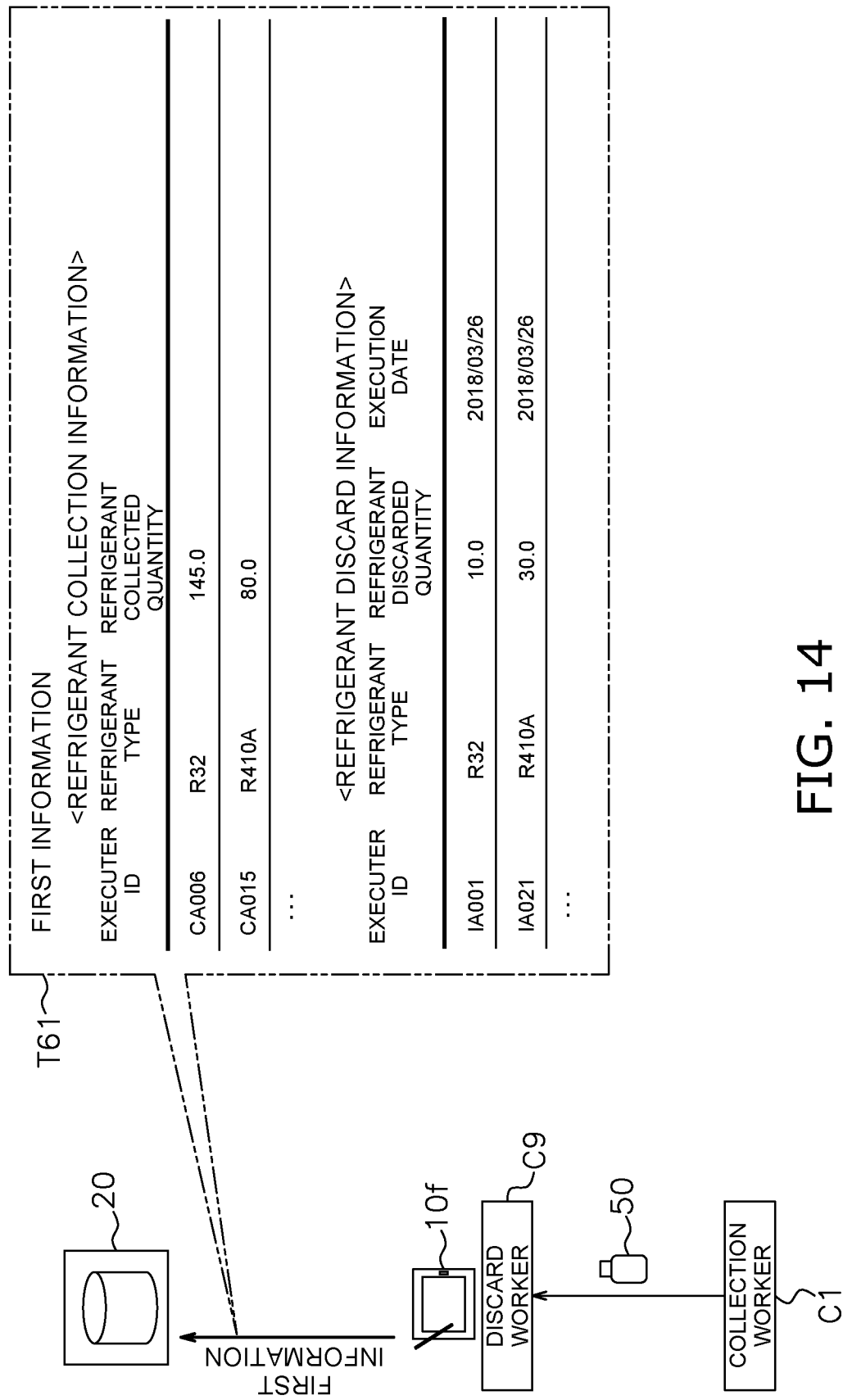
FIG. 14 is an explanatory view of first information acquired by the management server 20 upon input of a discard worker C9.

In this case, the discard worker C9 to execute work of discarding the refrigerant may input predetermined information to the management server 20. Examples of the predetermined information include the device ID of the refrigerant use device 30 as a work target. FIG. 14 is an explanatory view of first information T61 acquired by the acquisition unit 21 upon input of the discard worker C9. The discard worker C9 is assumed to be different from the collection worker C1 and the regeneration worker C4.

The discard worker C9 receives the collection cylinder 50 from the collection worker C1 or the like. The collection cylinder 50 received from the collection worker C1 is filled with the refrigerant unable to be regenerated and thus to be discarded. In this case, the collection worker C1 preliminarily sorts collection cylinders 50 filled with the refrigerant collected from the refrigerant use devices 30 into the collection cylinder 50 to be delivered to the regeneration worker C4 and the collection cylinder 50 to be delivered to the discard worker C9.

As indicated in FIG. 14, the first information T61 acquired by the acquisition unit 21 upon input of the discard worker C9 includes at least the refrigerant collection information and refrigerant discard information. The refrigerant collection information relates to the refrigerant not yet discarded by the discard worker C9. The refrigerant discard information relates to the refrigerant having been discarded by the discard worker C9.

The refrigerant collection information includes at least the executer ID as the worker ID of the collection worker C1, the refrigerant type, and the refrigerant collected quantity. The refrigerant type indicates the type of the refrigerant collected by the collection worker C1. The refrigerant collected quantity is refrigerant quantity collected by the collection worker C1. The refrigerant collection information has data for each collection worker C1 and for each refrigerant type.

The refrigerant discard information includes at least the executer ID as the worker ID of the discard worker C9, the refrigerant type, the refrigerant discarded quantity, and an executed date.

(5-2) Modification Example B

The embodiment assumes that the installation worker, the maintenance worker, and the collection worker are the identical first worker C1. The installation worker, the maintenance worker, and the collection worker may alternatively be workers different from one another. In this case, each of the workers may be made to input all the information on the work, or input may be simplified by provision of information already registered to the databases in the management server 20 to the workers as in the above example.

FIG. 15 is an explanatory chart of second information according to the present modification example with access authority only for the manager S. FIG. 15 includes "CA006" as the worker ID of the installation worker, "DA009" as the worker ID of the maintenance worker, "FA012" as the worker ID of the collection worker, "GA019" as the worker ID of the regeneration worker, and "HA019" as the worker ID of the distribution worker.

Neither the installation worker nor the maintenance worker according to the present modification example executes work of collecting the refrigerant from the refrigerant use devices 30. As indicated in FIG. 15, the information on the installation worker or the maintenance worker thus includes the refrigerant used quantity and the refrigerant to-be-collected quantity, but does not include the refrigerant collected quantity. The information on the collection worker includes only the refrigerant collected quantity.

Any of the device manufacturer, the refrigerant manufacturer, the distribution worker, the installation worker, the maintenance worker, the collection worker, the regeneration worker, and the discard worker may be identical, or may be different from one another. For example, the device manufacturer, the refrigerant manufacturer, the distribution worker, and the installation worker may be identical, or the installation worker, the collection worker, the regeneration worker, and the discard worker may be identical. In other words, there is no limitation as to which workers are identical.

(5-3) Modification Example C

In the refrigerant management system 100, as indicated in FIG. 13, the second information generated by the generation unit 23 with access authority only for the manager S associates the information on the worker to execute work relevant to the refrigerant use devices 30 and the refrigerant used in the refrigerant use devices 30 as work targets of the worker.

Alternatively, the second information with access authority only for the manager S may associate the information on the refrigerant use devices 30 and the refrigerant used in the refrigerant use devices 30. In this case, as indicated in FIG. 16, the second information with access authority only for the manager S may associate, as exemplary information on the refrigerant use device 30, the property ID of the property provided with the refrigerant use device 30 and the information on the refrigerant quantity in the refrigerant use device 30 installed in the property. FIG. 16 exemplifies the refrigerant type and the refrigerant quantity as the information on the refrigerant quantity in the refrigerant use device 30. The refrigerant quantity exemplarily indicates refrigerant quantity filled in the refrigerant use device 30 installed in the corresponding property and the refrigerant pipe connected to the refrigerant use device 30.

As indicated in FIG. 17, the second information with access authority only for the manager S may associate, as exemplary information on the refrigerant use device 30, the device owner ID of the owner of the refrigerant use device 30 and the information on the refrigerant quantity in the refrigerant use device 30 held by the owner. FIG. 17 exemplifies the refrigerant type and the refrigerant quantity as the information on the refrigerant quantity in the refrigerant use device 30.

The information on the refrigerant use device 30 is not limited to the above, but may exemplarily include at least one of the device ID, the device manufacturer ID, the device owner ID, and the device installation site information.

The second information with access authority only for the manager S may include both the information associating the information on the worker to execute work relevant to the refrigerant use device 30 with the refrigerant used in the refrigerant use device 30 as a work target of the worker, and the information associating the information on the refrigerant use device 30 with the refrigerant used in the refrigerant use device 30.

(5-4) Modification Example D

The management server 20 in the refrigerant management system 100 is managed by the manager S of the refrigerant management system 100. The manager S may be identical with any one of the workers operating the input terminals 10a, 10b, .... The manager S according to the embodiment may belong to the first worker C1.

(5-5) Modification Example E

The acquisition unit 21 in the management server 20 according to the embodiment can acquire the refrigerant already filled quantity of the refrigerant use device 30 with access to the device information database DB1 using the device ID of the refrigerant use device 30, and acquires the refrigerant already filled quantity of the refrigerant use device 30 with prediction from the ability information when the refrigerant already filled quantity is not registered to the device information database DB1.

According to the present modification example, when the refrigerant already filled quantity of the refrigerant use device 30 is inputted in step S16, the worker may operate a corresponding one of the input terminals 10a, 10b, . . . to directly input the refrigerant already filled quantity to the management server 20. Alternatively, the worker may operate the input terminals 10a, 10b, . . . to select appropriate refrigerant already filled quantity from a plurality of choices on the refrigerant already filled quantity.

The acquisition unit 21 may still alternatively estimate ability of the refrigerant use device 30 from the model name or the device ID of the refrigerant use device 30 and may acquire the refrigerant already filled quantity from the ability thus estimated. The acquisition unit 21 may still alternatively urge the worker to input the ability information on the refrigerant use device 30 and may acquire the refrigerant already filled quantity from the ability information thus inputted.

(5-6) Modification Example F

According to the embodiment, the worker having logged in the management server 20 directly inputs the information on work to the management server 20. Alternatively the information inputted to the own terminal or the like by the worker may be transmitted to the management server 20 so as to be inputted to the management server 20.

(5-7) Modification Example G

According to the embodiment, the installation worker inputs the installation information, and the maintenance worker and the collection worker subsequently input the maintenance information and the collection information, respectively. Alternatively, the maintenance worker may register, to the management server 20, the maintenance information on the refrigerant use device or the property provided with no installation information.

(5-8) Modification Example H

In the refrigerant management system 100, the evaluation unit 27 evaluates the worker in accordance with the second information T92 indicated in FIG. 13. The second information T92 includes the refrigerant quantity expected to be collected from the refrigerant use device 30 and the refrigerant quantity collected from the refrigerant use device 30. The second information T92 may include, in place of the refrigerant quantity expected to be collected from the refrigerant use device 30, information on use start timing of the refrigerant use device 30 as a work target of the worker. In this case, the evaluation unit 27 may acquire the refrigerant quantity expected to be collected from the refrigerant use device 30 in accordance with the information on the use start timing of the refrigerant use device 30. Examples of the information on the use start timing include refrigerant quantity filled in the refrigerant use device 30 and the refrigerant pipe connected to the refrigerant use device 30 upon use start of the refrigerant use device 30.

The second information T92 indicated in FIG. 13 may further include different information used for worker evaluation. For example, the second information T92 may further include, as parameters for worker evaluation, information on the refrigerant supplied quantity, the refrigerant regenerated quantity, the number of owned devices, or the like. The refrigerant supplied quantity corresponds to refrigerant quantity supplied to each of the workers from the distribution worker C5. The refrigerant regenerated quantity corresponds to refrigerant quantity collected from the refrigerant use device 30 as a work target of the worker and regenerated. The number of owned devices corresponds to the number of the refrigerant use devices 30 serving as work targets of the worker.

The evaluation unit 27 according to the present modification example may evaluate the worker in accordance with the refrigerant collected quantity, the refrigerant supplied quantity, and the refrigerant to-be-collected quantity included in the second information T92 or the like, and may calculate refrigerant quantity suppliable to the worker. In this case, the evaluation unit 27 can reduce refrigerant quantity newly supplied to the worker having large refrigerant supplied quantity, in other words, the worker having been supplied with large refrigerant quantity from the distribution worker C5.

The evaluation unit 27 according to the present modification example may evaluate the worker in accordance with the refrigerant regenerated quantity and the refrigerant used quantity included in the second information T92 or the like, and may calculate refrigerant quantity suppliable to the worker. In this case, the evaluation unit 27 can increase refrigerant quantity newly supplied to the worker having large refrigerant regenerated quantity, in other words, the worker having collected and regenerated large refrigerant quantity.

(5-9) Modification Example I

In the refrigerant management system 100, the evaluation unit 27 evaluates the worker in accordance with the second information T92 indicated in FIG. 13. The second information T92 includes the refrigerant quantity expected to be collected from the refrigerant use device 30 (the refrigerant to-be-collected quantity), the refrigerant quantity collected from the refrigerant use device 30 (the refrigerant collected quantity), and the like. The evaluation unit 27 assigns the priority order to the worker in accordance with the second information T92 or the like, and evaluates the worker in accordance with the priority order. In this case, the priority order may be assigned in accordance with information other than the second information T92.

The worker operates a corresponding one of the input terminals 10a, 10b, . . . to input, to the management server 20, information on the refrigerant use device 30 used for own work. The evaluation unit 27 may raise the priority order of the worker having inputted the information on the refrigerant use device 30. The refrigerant quantity expected to be collected from the refrigerant use device 30 used for work by the worker increases when the worker newly registers the refrigerant use device 30 to the management server 20. The evaluation unit 27 can thus assign a higher priority order to the worker with larger refrigerant quantity (the refrigerant to-be-collected quantity) expected to be collected from the refrigerant use device 30, and can stimulate the worker to register, to the management server 20, the information on the refrigerant use device 30 used for work or the like.

The evaluation unit 27 may lower the priority order of the worker as necessary. For example, after supply of the refrigerant to the worker from the distribution worker C5, the evaluation unit 27 may lower the priority order of the worker having supplied with the refrigerant in accordance with the refrigerant supplied quantity. This inhibits a problem that the worker with a low priority order is continuously less likely to be supplied with the refrigerant and the refrigerant is not appropriately distributed to a plurality of workers or the like.

(5-10) Modification Example J

In the refrigerant management system 100, the evaluation unit 27 assigns the priority order to each of the workers in accordance with the second information T92 indicated in FIG. 13 or the like, and calculates the refrigerant suppliable quantity for the worker in accordance with the priority order.

The evaluation unit 27 may alternatively rank the worker to be evaluated in accordance with the second information T92, instead of assigning the priority order to the worker, and may calculate the refrigerant suppliable quantity for the worker in accordance with such a rank. The evaluation unit 27 may still alternatively provide the worker to be evaluated with points in accordance with the second information T92, instead of assigning the priority order to the worker, and may calculate the refrigerant suppliable quantity for the worker in accordance with the points.

Described next as a specific example is the points (hereinafter, called "evaluation points") provided to the worker in accordance with the second information T92 for evaluation of the worker by the evaluation unit 27.

The evaluation points are provided to the worker having been involved in refrigerant collection and the worker expected to be involved in refrigerant collection. In other words, the worker is provided with higher evaluation points as the worker is more actively involved in refrigerant collection. As the worker is provided with higher evaluation points, the worker is more preferentially supplied with the refrigerant.

The evaluation points provided to the worker is determined in accordance with the refrigerant collected quantity, the refrigerant to-be-collected quantity, and the like of the worker. The refrigerant collected quantity is adopted in the case where the worker is the collection worker C1. The refrigerant collected quantity specifically indicates total refrigerant quantity collected from the refrigerant use device 30 as an own work target by the collection worker C1. Larger refrigerant collected quantity of the collection worker C1 indicates more active involvement in refrigerant collection by the worker, and the worker is thus provided with higher evaluation points.

The refrigerant to-be-collected quantity is adopted when the worker is the installation worker C1 or the maintenance worker C1. The refrigerant to-be-collected quantity specifically indicates refrigerant quantity expected to be collected by the collection worker C1 in the total refrigerant quantity used in the refrigerant use devices 30 as own work targets. The refrigerant to-be-collected quantity is exemplified by total refrigerant quantity filled in the refrigerant use device 30 after elapse of the predetermined period since installation or start of use. The predetermined period is set in accordance with the type of the refrigerant being used, the model of the refrigerant use device 30, and the like. Larger refrigerant to-be-collected quantity of the installation worker C1 or the maintenance worker C1 indicates more active involvement in refrigerant collection by the worker, and the worker is thus provided with higher evaluation points.

The evaluation unit 27 may provide each of the workers with evaluation points by totaling the refrigerant collected quantity and the refrigerant to-be-collected quantity for each of the workers.

Figure 18:
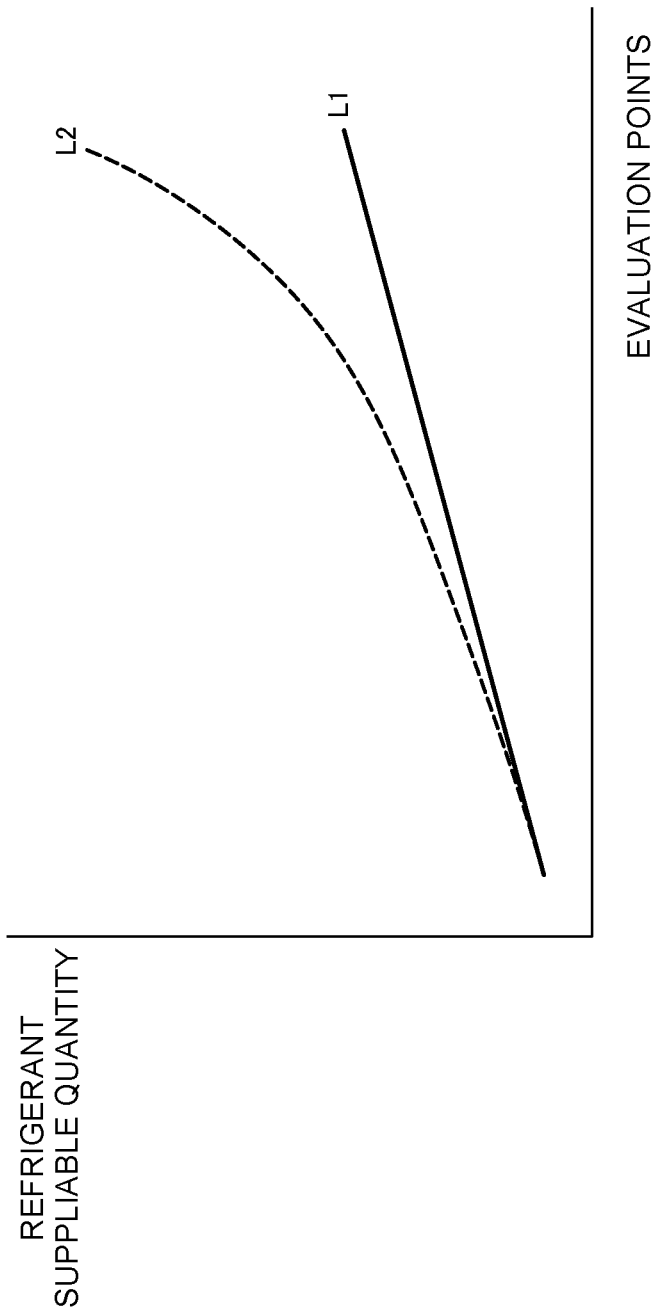
FIG. 18 is a graph indicating a relation between evaluation points and refrigerant suppliable quantity according to a modification example J.

FIG. 18 is a graph indicating a relation between the evaluation points provided to the worker and the refrigerant suppliable quantity calculated in accordance with the evaluation points. FIG. 18 includes two lines L1 and L2. The lines L1 and L2 each indicate a method of calculating the refrigerant suppliable quantity by the evaluation unit 27 in accordance with the evaluation points. As indicated in FIG. 18, the refrigerant suppliable quantity increases with higher evaluation points.

As indicated by the line L1 in FIG. 18, the evaluation unit 27 may calculate the refrigerant suppliable quantity such that the evaluation points provided to the worker and the refrigerant suppliable quantity have a proportional relation. As indicated by the line L2 in FIG. 18, the evaluation unit 27 may calculate the refrigerant suppliable quantity such that the refrigerant suppliable quantity has a higher increase rate as the worker is provided with higher evaluation points.

The modification example H is applicable to the present modification example. In other words, the evaluation points provided to the worker may be provided in accordance with a different reference in addition to the refrigerant collected quantity or the refrigerant to-be-collected quantity.

In a case where the worker newly inputs to the input terminal 10 information of the refrigerant use device 30 used for own work and transmits the information to the management server 20 for registration, the evaluation unit 27 may increase the evaluation points of the worker. The refrigerant quantity expected to be collected from the refrigerant use device 30 used for work by the worker increases when the worker newly registers the refrigerant use device 30 to the management server 20. The evaluation unit 27 can thus provide higher evaluation points to the worker with larger refrigerant quantity (the refrigerant to-be-collected quantity) expected to be collected from the refrigerant use device 30, and can stimulate the worker to register, to the management server 20, the information on the refrigerant use device 30 used for work or the like.

The evaluation unit 27 may lower the evaluation points of the worker as necessary. For example, after supply of the refrigerant to the worker from the distribution worker C5, the evaluation unit 27 may lower the evaluation points of the worker having supplied with the refrigerant in accordance with the refrigerant supplied quantity. This inhibits a problem that the worker with low evaluation points is continuously less likely to be supplied with the refrigerant and the refrigerant is not appropriately distributed to a plurality of workers.

(5-11) Modification Example K

The storage unit 22 stores the second information T92 indicated in FIG. 13. The storage unit 22 may further store information on a service provided to the worker as to the refrigerant used in the refrigerant use device 30 and executed. For example, in a case where the service relates to refrigerant supply, the storage unit 22 may further store information on refrigerant quantity supplied to each of the workers as a service.

(5-12) Modification Example L

The evaluation unit 27 calculates the refrigerant suppliable quantity for each of the workers in accordance with total quantity of the refrigerant to-be-collected quantity and the refrigerant collected quantity included in the second information T92 indicated in FIG. 13, and the refrigerant distributed quantity included in the second information T92. The refrigerant used in the refrigerant use device 30 is not entirely collected, the collected refrigerant is not entirely regenerated. The refrigerant suppliable quantity is thus less than the total quantity of the refrigerant to-be-collected quantity and the refrigerant collected quantity. The refrigerant suppliable quantity may exemplarily be calculated in accordance with the following equation.

Refrigerant suppliable quantity=(refrigerant collected quantity×$a$)+(refrigerant to-be-collected quantity×$b$)+refrigerant regenerated quantity The above equation includes coefficients a and b each having a numerical value equal to or more than zero and less than one, and the coefficients a and b are appropriately set by the manager of the refrigerant management system 100. The coefficient a exemplarily having 0.9 indicates that 90% of the refrigerant collected by the collection worker C1 is to be regenerated so as to be suppliable. The coefficient b exemplarily having 0.3 indicates that 30% of the refrigerant used in the refrigerant use device 30 is to be collected and regenerated so as to be suppliable. Each of the coefficients a and b may set to have a different value depending on the refrigerant type. The above equation assumes that the refrigerant regenerated quantity is entirely suppliable.

Information other than the refrigerant collected quantity, the refrigerant to-be-collected quantity, and the refrigerant regenerated quantity may be used for calculation of the refrigerant suppliable quantity. The refrigerant suppliable quantity may alternatively be calculated with further reference to information on the refrigerant used in the refrigerant use device 30 to be used no more or be discarded. The refrigerant suppliable quantity may still alternatively be calculated with further reference to the refrigerant supplied quantity that is refrigerant quantity already supplied to the worker. For example, in this case, the refrigerant suppliable quantity may be calculated such that the worker having larger refrigerant supplied quantity has smaller refrigerant suppliable quantity.

(5-13) Modification Example M

The evaluation unit 27 calculates the refrigerant suppliable quantity in accordance with the refrigerant to-be-collected quantity and the refrigerant collected quantity included in the second information T92 indicated in FIG. 13. The evaluation unit 27 may alternatively calculate the refrigerant suppliable quantity further in consideration of a different element such as a refrigerant regeneration result of the worker and the refrigerant quantity held by the worker. Description is made next to an exemplary method of calculating refrigerant suppliable quantity.

Figure 19:
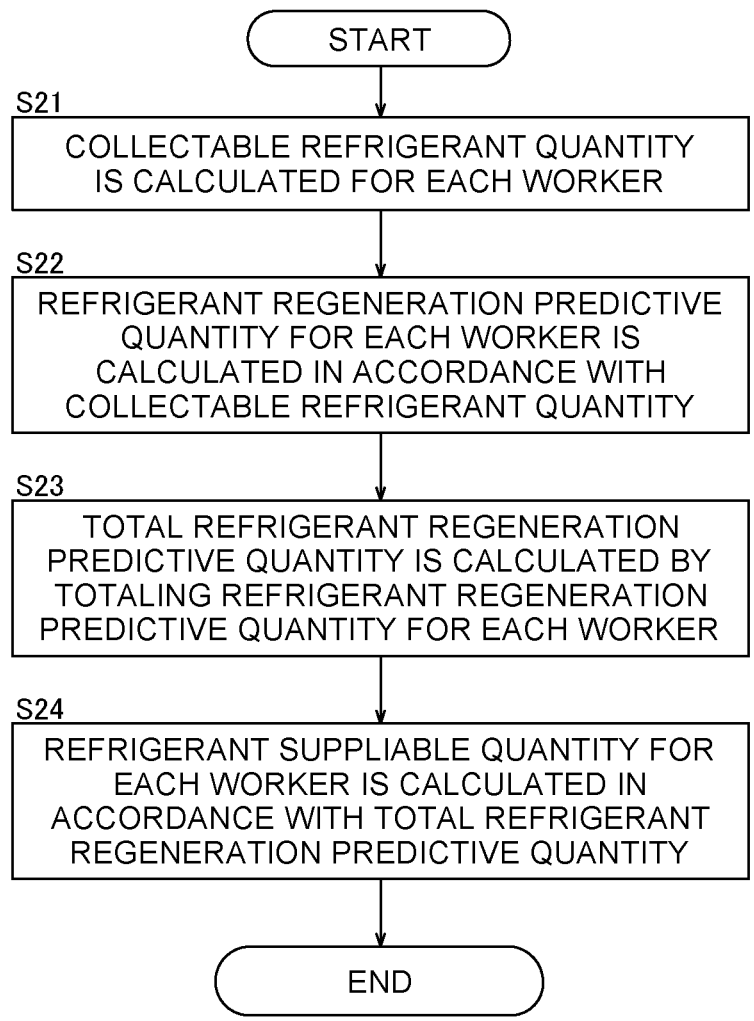
FIG. 19 is a flowchart depicting calculation of refrigerant suppliable quantity according to a modification example M.

FIG. 19 is a flowchart depicting calculation of refrigerant suppliable quantity S. FIG. 19 includes processing in step S21 to step S25. The processing depicted in FIG. 19 is executed for each worker, and the refrigerant suppliable quantity S is calculated for each worker. The worker is a refrigerant supply target and corresponds to the installation worker C1 and the maintenance worker C1.

Step S21 involves calculating collectable refrigerant quantity A for each of the workers. The collectable refrigerant quantity A is total refrigerant quantity filled in all the refrigerant use devices 30 as refrigerant collection targets and work targets of the worker. The refrigerant use devices 30 as refrigerant collection targets include the refrigerant use device 30 after elapse of a predetermined use period since an installation date, and the refrigerant use device 30 on a predetermined day with the predetermined use period having been elapsed since the installation date. The predetermined use period differs in accordance with the model of the refrigerant use device 30, and is 10 years or the like. Examples of the predetermined day include one year after present time. The refrigerant quantity filled in the refrigerant use device 30 specifically indicates refrigerant used quantity included in the second information T22, and is obtained by totaling the refrigerant already filled quantity and the total refrigerant additionally filled quantity.

Step S22 involves calculating refrigerant regeneration predictive quantity P for each of the workers in accordance with the collectable refrigerant quantity A. The refrigerant regeneration predictive quantity P is refrigerant quantity predicted to be regenerated before the predetermined day in the collectable refrigerant quantity A. The refrigerant regeneration predictive quantity P is calculated in accordance with the following equation.

Refrigerant regeneration predictive quantity $P$=collectable refrigerant quantity $A$×regeneration solid volume percentage $r$ Regeneration solid volume percentage $r$=most recent regenerated quantity $W$/most recent filled quantity $R$ The most recent filled quantity R corresponds to refrigerant quantity filled in all the refrigerant use devices 30 having the refrigerant collected within a most recent predetermined period. The most recent regenerated quantity W corresponds to refrigerant quantity collected and regenerated within the most recent predetermined period in the most recent filled quantity R. Examples of the most recent predetermined period include a period within a past one year.

Step S23 involves calculating total refrigerant regeneration predictive quantity SP obtained by totaling the refrigerant regeneration predictive quantity P of all the workers registered to the refrigerant management system 100.

Step S24 involves calculating the refrigerant suppliable quantity S for each of the workers in accordance with the total refrigerant regeneration predictive quantity SP. The refrigerant suppliable quantity S is calculated in accordance with the following equation.

Refrigerant suppliable quantity $S$=(total refrigerant regeneration predictive quantity $SP$+refrigerant stocked quantity $a$)×share percentage $p$ The refrigerant stocked quantity a is, for example, refrigerant quantity stored by the distribution worker C5 and suppliable to the worker. The share percentage p is determined for each of the workers. Refrigerant quantity to be supplied increases as the share percentage p is higher. The share percentage p is determined in accordance with various parameters. The share percentage p may be determined in accordance with the refrigerant to-be-collected quantity, the refrigerant collected quantity, the refrigerant regenerated quantity, the refrigerant supplied quantity, the regeneration solid volume percentage, a type of business of the worker, and a sales ratio. The refrigerant supplied quantity corresponds to refrigerant quantity supplied to the worker within the most recent predetermined period. The sales ratio is exemplarily a proportion of the refrigerant use devices 30 manufactured by a predetermined device manufacturer in all the refrigerant use devices 30 as work targets of the worker. The share percentage p may be determined in accordance with the priority order, the evaluation points, and the like provided to each of the workers described above.

(5-14) Modification Example N

The execution date corresponds to the work day or the work month in the embodiment. The work day or the work month according to the embodiment corresponds to a day or a month of registration of at least one of the installation information and the maintenance information. The work day may be at least one of the day of actual installation by the installation worker C1, and the day of actual maintenance by the maintenance worker C1. The work month may be at least one of the month of actual installation by the installation worker C1, and the month of actual maintenance by the maintenance worker C1. In this case, the management server 20 may cause the installation worker C1 and the maintenance worker C1 to input the work day or the work month.

(6) Conclusion

The embodiment of the present disclosure has been described above. Various modifications to modes and details should be available without departing from the object and the scope of the present disclosure recited in the claims.

The refrigerant management system is applicable for management of refrigerant quantity used in the refrigerant use device.

The refrigerant management system is applicable for appropriate supply of the refrigerant to the worker needing the refrigerant.

What is claimed is:

1. A refrigerant management system comprising:
at least one computer including an acquisition unit and a generation unit,
the acquisition unit being configured to
acquire, during at least one of installation and maintenance of a refrigerant use device,
first information including device specifying information usable to specify the refrigerant use device,
worker information on a worker to execute work relevant to the refrigerant use device, and
refrigerant additionally filled quantity information including refrigerant additionally filled quantity additionally filled in the refrigerant use device,
acquire refrigerant already filled quantity preliminarily filled in the refrigerant use device, in accordance with the device specifying information in the first information acquired, and
acquire refrigerant used quantity used in the refrigerant use device by totaling the refrigerant already filled quantity acquired and the refrigerant additionally filled quantity included in the refrigerant additionally filled quantity information in the first information acquired, and
the generation unit being configured to generate second information associating the refrigerant used quantity and the worker, from the refrigerant used quantity acquired by the acquisition unit and the worker information in the first information acquired by the acquisition unit.

2. The refrigerant management system according to claim 1, wherein
the at least one computer further includes a storage unit,
the storage unit is configured to store the refrigerant already filled quantity in association with the device specifying information, and
the acquisition unit is further configured to acquire the refrigerant already filled quantity stored in the storage unit, in accordance with the device specifying information in the first information acquired.

3. The refrigerant management system according to claim 1, wherein
the acquisition unit is further configured to
acquire ability information on ability of the refrigerant use device, in accordance with the device specifying information in the first information acquired, and
acquire the refrigerant already filled quantity in accordance with the ability information acquired.

4. The refrigerant management system according to claim 1, wherein
the acquisition unit is further configured to
acquire input data including ability information on ability of the refrigerant use device, and
acquire the refrigerant already filled quantity in accordance with the ability information included in the input data.

5. The refrigerant management system according to claim 1, wherein
the acquisition unit is further configured to
acquire the refrigerant already filled quantity being stored, in accordance with the device specifying information in the first information acquired, when the refrigerant already filled quantity is stored in association with the device specifying information,
acquire ability information on ability of the refrigerant use device, in accordance with the device specifying information in the first information acquired, and
acquire the refrigerant already filled quantity in accordance with the ability information acquired, when the refrigerant already filled quantity is not stored in association with the device specifying information.

6. The refrigerant management system according to claim 1, wherein
the acquisition unit is further configured to acquire total quantity of the refrigerant used quantity of a plurality of the refrigerant use devices serving as work targets of the worker, in accordance with a plurality of pieces of the first information, and
the generation unit is further configured to generate, as the second information, information associating the total quantity acquired by the acquisition unit and the worker.

7. The refrigerant management system according to claim 1, wherein
the acquisition unit is further configured to acquire refrigerant to-be-collected quantity to be collected from the refrigerant use device within a predetermined period, in accordance with the first information, and
the generation unit is further configured to generate, as the second information, information associating the refrigerant to-be-collected quantity acquired by the acquisition unit and the worker.

8. The refrigerant management system according to claim 7, wherein
the first information further includes third information including a work day or a work month of execution of at least one of
installation work during installation of the refrigerant use device and
maintenance work during maintenance of the refrigerant use device, and
the acquisition unit is further configured to acquire the refrigerant to-be-collected quantity in accordance with the third information.

9. The refrigerant management system according to claim 8, wherein
the acquisition unit is further configured to acquire the refrigerant to-be-collected quantity in accordance with refrigerant quantity used in the refrigerant use device after elapse of a predetermined period since the work day or the work month included in the third information.

10. The refrigerant management system according to claim 1, wherein
the at least one computer further includes an evaluation unit,
the evaluation unit is configured to evaluate the worker in accordance with the first information acquired by the acquisition unit, according to at least one of
a number of the refrigerant use devices serving as work targets of the worker and
the refrigerant used quantity used in the refrigerant use devices serving as the work targets of the worker.

11. The refrigerant management system according to claim 10, wherein
the evaluation unit is further configured to evaluate the worker in accordance with the second information generated by the generation unit.

12. The refrigerant management system according to claim 11, wherein
the acquisition unit is further configured to acquire refrigerant to-be-collected quantity to be collected from the refrigerant use device within a predetermined period, in accordance with the refrigerant used quantity acquired,
the generation unit is further configured to generate, as the second information, information associating the refrigerant to-be-collected quantity acquired by the acquisition unit and the worker, and
the evaluation unit is further configured to evaluate the worker in accordance with the refrigerant to-be-collected quantity.

13. The refrigerant management system according to claim 12, wherein
the first information further includes third information including a work day or a work month of execution of at least one of
installation work during installation of the refrigerant use device and
maintenance work during maintenance of the refrigerant use device, and
the acquisition unit is further configured to acquire the refrigerant to-be-collected quantity in accordance with refrigerant quantity used in the refrigerant use device after elapse of a predetermined period since the work day or the work month included in the third information.

14. The refrigerant management system according to claim 12, wherein
the evaluation unit is further configured to calculate refrigerant quantity suppliable to the worker in accordance with the refrigerant to-be-collected quantity.

15. The refrigerant management system according to claim 12, wherein
the acquisition unit is further configured to acquire refrigerant collected quantity collected from the refrigerant use device, and
the evaluation unit is further configured to
evaluate the worker in accordance with the refrigerant collected quantity and the refrigerant to-be-collected quantity, and
calculate refrigerant quantity suppliable to the worker.

16. The refrigerant management system according to claim 15, wherein
the acquisition unit is further configured to acquire refrigerant supplied quantity supplied to the worker, and
the evaluation unit is further configured to
evaluate the worker in accordance with the refrigerant collected quantity, the refrigerant supplied quantity, and the refrigerant to-be-collected quantity, and
calculate refrigerant quantity suppliable to the worker.

17. The refrigerant management system according to claim 11, wherein
the acquisition unit is further configured to acquire refrigerant regenerated quantity collected from the refrigerant use device and regenerated, and
the evaluation unit is further configured to evaluate the worker in accordance with the refrigerant regenerated quantity and the refrigerant used quantity.

18. A refrigerant management method comprising:
acquiring, during at least one of installation and maintenance of a refrigerant use device,
first information including device specifying information for specifying the refrigerant use device,
worker information on a worker to execute work relevant to the refrigerant use device, and
refrigerant additionally filled quantity information including refrigerant additionally filled quantity that is refrigerant quantity additionally filled in the refrigerant use device,
acquiring refrigerant already filled quantity preliminarily filled in the refrigerant use device in accordance with the device specifying information in the first information acquired,
acquiring refrigerant used quantity used in the refrigerant use device by totaling the refrigerant already filled quantity acquired and the refrigerant additionally filled quantity included in the refrigerant additionally filled quantity information in the first information acquired, and
generating second information associating the refrigerant used quantity and the worker, from the refrigerant used quantity acquired and the worker information in the first information acquired.

* * * * *